(12) United States Patent
Asakawa et al.

(10) Patent No.: US 10,436,413 B2
(45) Date of Patent: Oct. 8, 2019

(54) ILLUMINATION DEVICE

(71) Applicant: TOYODA GOSEI CO., LTD., Kiyosu-shi (JP)

(72) Inventors: Renge Asakawa, Kiyosu (JP); Yoshiharu Tanaka, Kiyosu (JP); Hirotaka Fukui, Kiyosu (JP); Yuki Kuramitsu, Kiyosu (JP); Taro Isogai, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 16/129,463

(22) Filed: Sep. 12, 2018

(65) Prior Publication Data

US 2019/0086053 A1 Mar. 21, 2019

(30) Foreign Application Priority Data

Sep. 21, 2017 (JP) .................................. 2017-181829
Sep. 21, 2017 (JP) .................................. 2017-181830

(51) Int. Cl.
*F21S 43/236* (2018.01)
*F21V 8/00* (2006.01)
(Continued)

(52) U.S. Cl.
CPC .......... *F21S 43/236* (2018.01); *B60Q 1/0011* (2013.01); *B60Q 1/2607* (2013.01);
(Continued)

(58) Field of Classification Search
CPC ...... F21S 43/236; F21S 43/249; F21S 43/245; F21S 43/237; F21S 43/14; B60Q 1/2607;
(Continued)

(56) References Cited

U.S. PATENT DOCUMENTS

2003/0156422 A1* 8/2003 Tatewaki ................. B60Q 3/80
362/487
2007/0217217 A1* 9/2007 Chon .................... F21S 10/005
362/555

(Continued)

FOREIGN PATENT DOCUMENTS

JP 2012-017063 1/2012
JP 2012-096564 A 5/2012
JP 6091096 B2 3/2017

*Primary Examiner* — Alexander H Taningco
*Assistant Examiner* — Renan Luque
(74) *Attorney, Agent, or Firm* — McGinn IP Law Group, PLLC.

(57) ABSTRACT

An illumination device includes: an elongated light guide; a first light source; a second light source; and a controller. A first increase beginning time point at which the brightness of the first light source begins to increase from zero is prior to a second increase beginning time point at which the brightness of the second light source begins to increase from zero. A first increase finish time point at which the brightness of the first light source finishes increasing to the first set brightness is simultaneous with or prior to a second increase finish time point at which the brightness of the second light source finishes increasing to the second set brightness. A time from the first increase beginning time point to the second increase finish time point is not more than 0.2 seconds.

18 Claims, 17 Drawing Sheets

(51) Int. Cl.
| | |
|---|---|
| B60Q 1/30 | (2006.01) |
| F21V 23/00 | (2015.01) |
| B60Q 1/00 | (2006.01) |
| B60Q 1/26 | (2006.01) |
| B60Q 1/34 | (2006.01) |
| B60Q 3/74 | (2017.01) |
| B60Q 3/64 | (2017.01) |
| B60Q 3/80 | (2017.01) |
| F21S 43/14 | (2018.01) |
| F21S 43/237 | (2018.01) |
| F21S 43/245 | (2018.01) |
| F21S 43/249 | (2018.01) |
| F21W 103/20 | (2018.01) |

(52) U.S. Cl.
CPC ............... *B60Q 1/30* (2013.01); *B60Q 1/34* (2013.01); *B60Q 3/64* (2017.02); *B60Q 3/74* (2017.02); *B60Q 3/80* (2017.02); *F21S 43/14* (2018.01); *F21S 43/237* (2018.01); *F21S 43/245* (2018.01); *F21S 43/249* (2018.01); *F21V 23/003* (2013.01); *G02B 6/0071* (2013.01); *F21W 2103/20* (2018.01)

(58) Field of Classification Search
CPC ... B60Q 3/80; B60Q 3/64; B60Q 3/74; B60Q 1/34; B60Q 1/0011; B60Q 1/30; F21V 23/003; G02B 6/0071; F21W 2103/20
See application file for complete search history.

(56) References Cited

U.S. PATENT DOCUMENTS

| | | | |
|---|---|---|---|
| 2014/0078772 A1* | 3/2014 | Gaydoul | F21S 43/13 362/555 |
| 2015/0092434 A1* | 4/2015 | Satake | G02B 6/001 362/511 |
| 2015/0274071 A1* | 10/2015 | Gocke | B60Q 1/18 362/511 |
| 2017/0131459 A1* | 5/2017 | Yamaguchi | G02B 6/0051 |

* cited by examiner

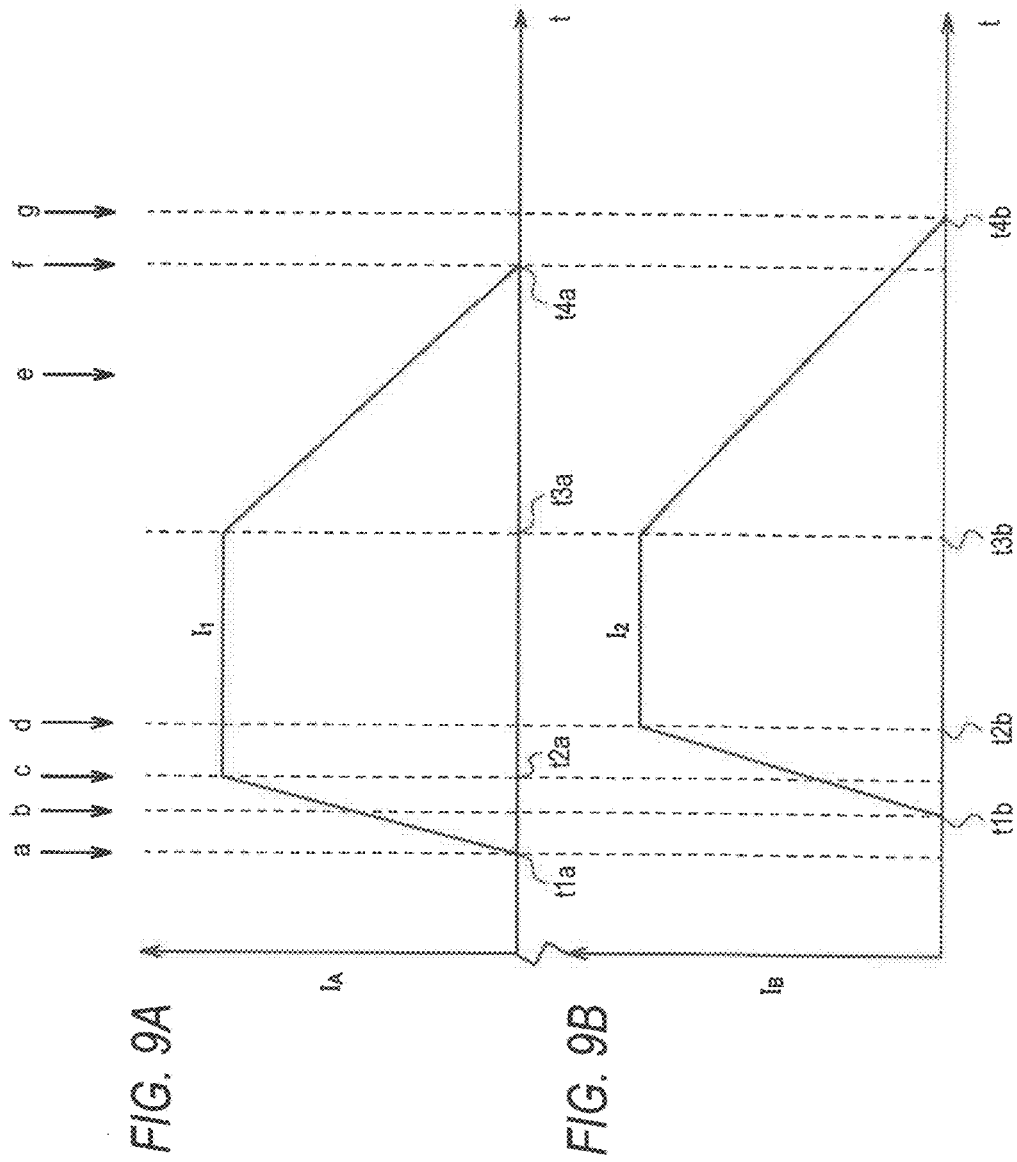

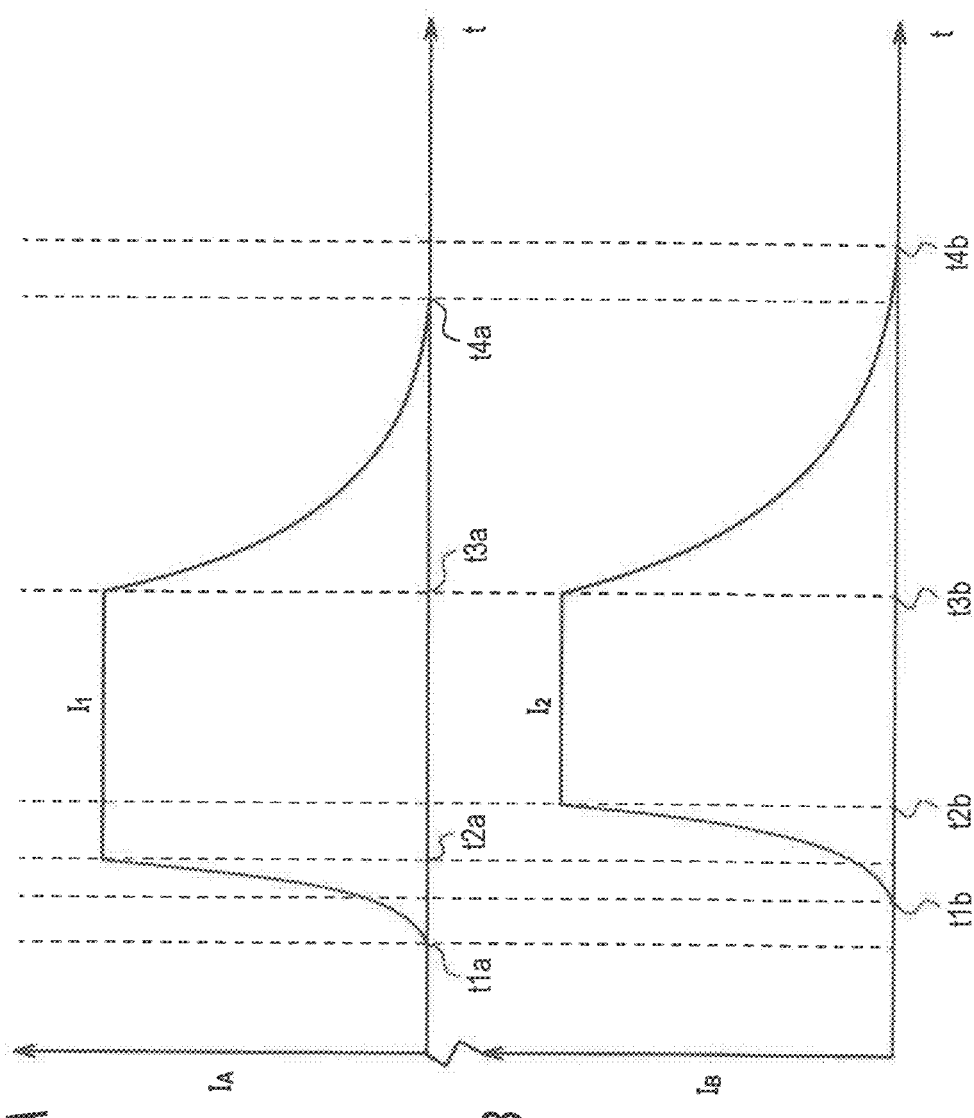

ILLUMINATION DEVICE

CROSS-REFERENCE TO RELATED APPLICATION(S)

This application is based upon and claims the benefit of priority from prior Japanese patent application No. 2017-181829, filed on Sep. 21, 2017 and Japanese patent application No. 2017-181830, filed on Sep. 21, 2017, the entire contents of which are incorporated herein by reference.

BACKGROUND

1. Technical Field

The present invention relates to an illumination device having a light guide.

2. Background Art

In recent years, as a turn lamp or a vehicle interior illumination, a vehicular illumination device has been proposed that produces an illumination effect such that light appears as if flowing linearly or in a belt form in one direction by arranging a multiplicity of light sources within a cover and performing control such that the light sources are successively lit in one direction and the light sources are successively unlit in the one direction (for example, see JP-A-2012-96564 and JP-A-2012-17063).

In this case, since the lighting timing is determined for each one of the light sources, a control portion that has an electronic circuit and a control program is required in addition to the multiplicity of light sources. Moreover, if the movement distance of the light is increased, the number of necessary light sources is increased, so that the wiring and the electronic system become complicated. For these reasons, the illumination device producing the above-described illumination effect is high in cost.

Japanese Patent No. 6091096 proposes to dispose a light source at each end of an elongated light guiding member and make light appear as if flowing from one end to the other end of the light guiding member with a small number of light sources by shifting the lighting and unlighting timings of one light source and the other light source (see FIG. 5 of Japanese Patent No. 6091096).

The technology shown in FIG. 5 of Japanese Patent No. 6091096 intends to produce an illumination effect such that light appears as if flowing from one end to the other end of the light guiding member by combining fully lit state and unlit state of each of one light source and the other light source. For this reason, the light emission mode of the light guiding member stepwisely changes with respect to the lapse of time; as a consequence, even though the part of the light guiding member that appears bright moves from one end to the other end thereof, the movement is a step-by-step one, so that there is a possibility that the movement cannot be expressed as a smooth movement of light.

Japanese Patent No. 6091096 further describes that by performing dimming of each of one and the other light sources by dimming means of a phase control dimming method, a PWM dimming method or the like, the light gradation is enhanced to clearly show smoothly flowing light (see paragraphs [0074] to [0076] of Japanese Patent No. 6091096). However, there is no concrete description as to the lighting condition of the light sources in that case.

Moreover, since the neighborhood of the central part of the elongated light guiding member is far from the light sources disposed at both ends of the light guiding member, there is also a possibility that brightness is insufficient in the neighborhood of the central part of the light guiding member.

Further, when a presentation such that light appears as if flowing over separable members is provided by using the illumination device described in Japanese Patent No. 6091096, it is necessary to set the above-described illumination device for each member, so that the effect of reducing the number of light sources being used is reduced.

Accordingly, an object of the present invention is to provide an illumination device capable of suitably producing an illumination effect such that light appears as if smoothly flowing with a small number of light sources.

SUMMARY

According to an aspect of the invention, there is provided an illumination device comprising: an elongated light guide; a first light source that applies light to a first end surface of the light guide; a second light source that applies light to a second end surface of the light guide; and a controller that performs lighting control of the first light source and the second light source, wherein the lighting control includes: a first increase control to increase a brightness of the first light source from zero to a first set brightness; a first maintenance control to maintain the brightness of the first light source at the first set brightness subsequently to the first increase control; and a first decrease control to decrease the brightness of the first light source from the first set brightness to zero subsequently to the first maintenance control, the lighting control includes: a second increase control to increase a brightness of the second light source from zero to a second set brightness; a second maintenance control to maintain the brightness of the second light source at the second set brightness subsequently to the second increase control; and a second decrease control to decrease the brightness of the second light source from the second set brightness to zero subsequently to the second maintenance control, when a time point at which the controller begins to increase the brightness of the first light source from zero by the first increase control is a first increase beginning time point and a time point at which the controller begins to increase the brightness of the second light source from zero by the second increase control is a second increase beginning time point, the first increase beginning time point is prior to the second increase beginning time point, when a time point at which the controller finishes increasing the brightness of the first light source to the first set brightness by the first increase control is a first increase finish time point and a time point at which the controller finishes increasing the brightness of the second light source to the second set brightness by the second increase control is a second increase finish time point, the first increase finish time point is simultaneous with the second increase finish time point or prior to the second increase finish time point, when a time point at which the controller begins to decrease the brightness of the first light source from the first set brightness by the first decrease control is a first decrease beginning time point and a time point at which the controller begins to decrease the brightness of the second light source from the second set brightness by the second decrease control is a second decrease beginning time point, the first decrease beginning time point is simultaneous with the second decrease beginning time point, and a time from the first increase beginning time point to the second increase finish time point is not more than 0.2 seconds.

According to an aspect of the invention, there is provided an illumination device comprising: a first light guide and a second light guide that are elongated, the first light guide and the second light guide disposed in series with each other in a direction of a length thereof; a first light source that applies light to a first end surface of the first light guide on a side farther from the second light guide; a second light source that applies light to a first end surface of the second light guide on a side closer to the first light guide; and a controller that performs lighting control including control of lighting of the first light source and the second light source, wherein the lighting control includes: a first increase control to increase a brightness of the first light source from zero to a first set brightness; a first maintenance control to maintain the brightness of the first light source at the first set brightness subsequently to the first increase control; and a first decrease control to decrease the brightness of the first light source from the first set brightness to zero subsequently to the first maintenance control, the lighting control includes: a second increase control to increase a brightness of the second light source from zero to a second set brightness; a second maintenance control to maintain the brightness of the second light source at the second set brightness subsequently to the second increase control; and a second decrease control to decrease the brightness of the second light source from the second set brightness to zero subsequently to the second maintenance control, when a time point at which the controller begins to increase the brightness of the first light source from zero by the first increase control is a first increase beginning time point and a time point at which the controller begins to increase the brightness of the second light source from zero by the second increase control is a second increase beginning time point, the first increase beginning time point is prior to the second increase beginning time point, when a time point at which the controller finishes increasing the brightness of the first light source to the first set brightness by the first increase control is a first increase finish time point and a time point at which the controller finishes increasing the brightness of the second light source to the second set brightness by the second increase control is a second increase finish time point, the first increase finish time point is prior to the second increase finish time point, when a time point at which the controller begins to decrease the brightness of the first light source from the first set brightness by the first decrease control is a first decrease beginning time point and a time point at which the controller begins to decrease the brightness of the second light source from the second set brightness by the second decrease control is a second decrease beginning time point, the first decrease beginning time point is simultaneous with the second decrease beginning time point, and a time from the first increase beginning time point to the second increase finish time point is not more than 0.2 seconds.

BRIEF DESCRIPTION OF THE DRAWINGS

FIGS. 9A and 9B are views for explaining the lighting control of the illumination device of FIG. 7.

FIGS. 11A and 11B are views for explaining the lighting control by a modification of the third embodiment.

DETAILED DESCRIPTION OF EXEMPLARY EMBODIMENTS

One end surface 1011A of the light guide 1010 in the direction of the length functions as an incident surface where light from the one light source 1020A is incident. Moreover, the other end surface 1011B of the light guide 1010 in the direction of the length functions as an incident surface where light from the other light source 1020B is incident. The light incident into the light guide 1010 from the one end surface 1011A or the other end surface 1011B of the light guide 1010 travels inside the light guide 1010 while repetitively reflecting at a peripheral surface 1012 of the light guide 1010. In the process of traveling inside the light guide 1010, light leaks little by little from the peripheral surface 1012 when part of the light exceeds a critical angle. For this reason, the peripheral surface 1012 functions as a light exit surface from the entire area of which light leaks.

The light guide 1010 may be made to leak light by some processing or the like, or may contain a light diffusing material. In this case, light diffuses multidirectionally inside the light guide 1010 so that it easily impinges on the peripheral surface 1012, which makes the light easy to leak. The light diffusing material only necessarily has the property of diffusing and reflecting light, and as the light diffusing material, for example, a conventional general material such as titanium oxide may be used.

(Light Source)

Figure 2:
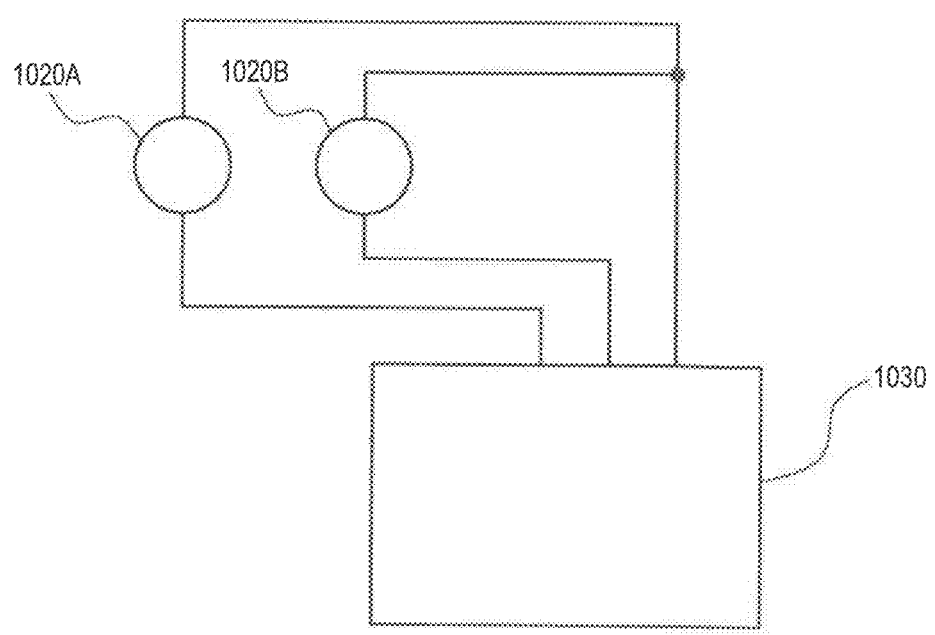
FIG. 2 is a schematic block diagram of the electric circuit configuration of the illumination device of FIG. 1.

The one light source 1020A has an LED 1021A, and the other light source 1020B has an LED 1021B. Instead of the LED 1021A and the LED 1021B, known light sources such as EL (electro luminescence) elements, incandescent light bulbs, halogen lamps or cold-cathode tubes may be adopted. The light emitted from the one and other light sources 1020A and 1020B may be of any color. As shown in FIG. 2, the one and other light sources 1020A and 1020B are electrically connected to the control portion 1030 provided with a control circuit.

(Control Portion)

The control portion 1030 is capable of performing lighting control in a mode of temporally and continuously changing the brightness of each of the one and other light sources 1020A and 1020B by known dimming control means such as the phase control dimming method in which supplied power is adjusted or the PWM (pulse width modulation) dimming method in which lighting and unlighting are caused to be repeated based on a PWM signal in addition to the control to maintain the brightnesses of the light sources 1020A and 1020B constant.

(Lighting Control)

Figure 1:
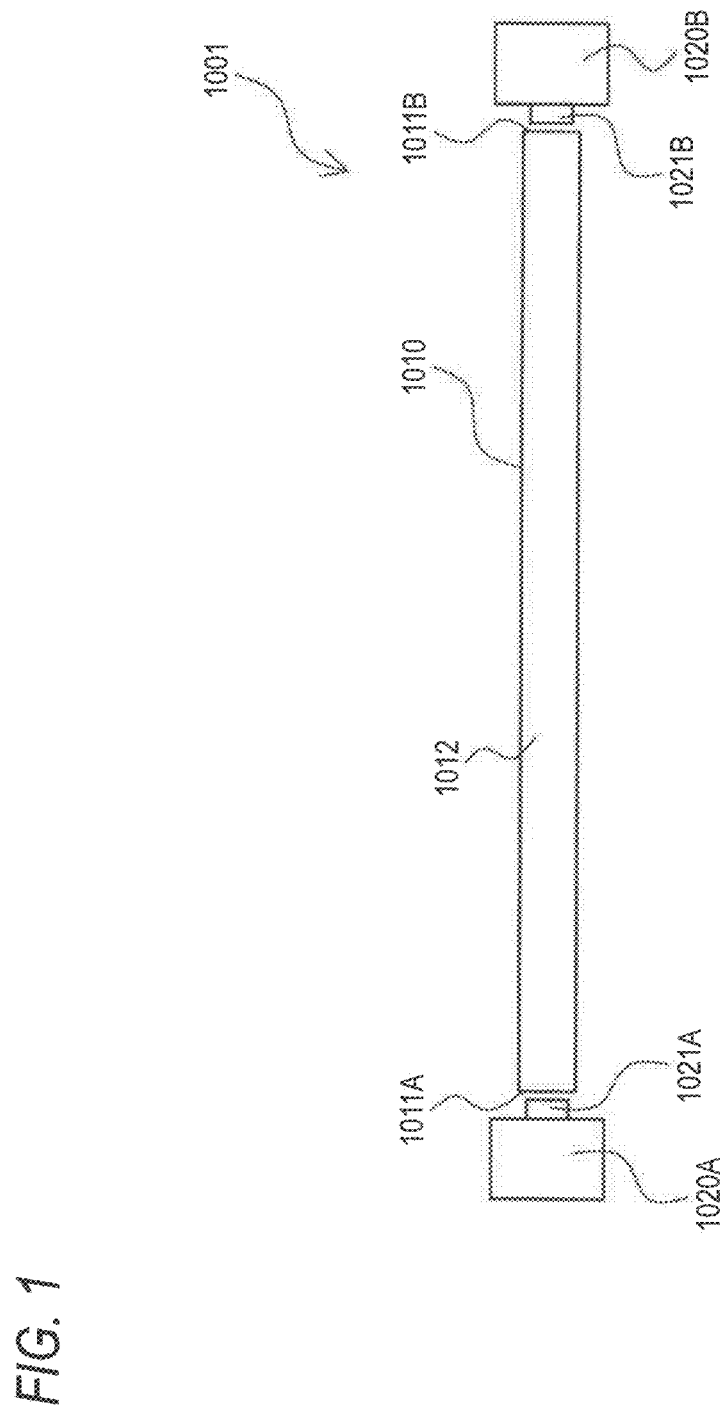
FIG. 1 is a schematic front view for explaining the structure of an illumination device according to a first embodiment of the present invention.

Next, an example of the lighting control of the illumination device 1001 performed by the control portion 1030 according to the present embodiment will be described based also on FIGS. 3A and 3B and 4A to 4G in addition to FIGS. 1 and 2. FIG. 3A is an explanatory view showing the mode of control of the brightness $I_A$ of the one light source 1020A of the illumination device 1001 with the horizontal axis representing the time t. FIG. 3B is an explanatory view showing the mode of control of the brightness $I_B$ of the other light source 1020B of the illumination device 1001 with the horizontal axis representing the time t. FIGS. 4A to 4G are explanatory views schematically showing an example of temporal changes of the light emission mode of the illumination device 1001 by the lighting control of FIGS. 3A and 3B. The light emission modes of the illumination device 1001 at the time points a to g of FIGS. 3A and 3B are schematically shown in FIG. 4A to 4G, respectively.

The lighting control performed by the control portion 1030 for the one light source 1020A includes, as shown in FIG. 3A, a first increase control to gradually increase the brightness $I_A$ of the one light source 1020A from zero to a first set brightness $I_1$, a first maintenance control to maintain the brightness $I_A$ of the one light source 1020A at the first set brightness $I_1$ subsequently to the first increase control, and a first decrease control to gradually decrease the brightness $I_A$ of the one light source 1020A from the first set brightness $I_1$ to zero subsequently to the first maintenance control. Thereby, the amount of light projection onto the one end surface 1011A of the light guide 1010 from the one light source 1020A gradually increases by the first increase control, becomes constant by the first maintenance control, and gradually decreases by the first decrease control.

Moreover, the lighting control performed by the control portion 1030 for the other light source 1020B includes, as shown in FIG. 3B, a second increase control to gradually increase the brightness $I_B$ of the other light source 1020B from zero to a second set brightness $I_2$, a second maintenance control to maintain the brightness $I_B$ of the other light source 1020B at the second set brightness $I_2$ subsequently to the second increase control, and a second decrease control to gradually decrease the brightness $I_B$ of the other light source 1020B from the second set brightness $I_2$ to zero subsequently to the second maintenance control. Thereby, the amount of light projection onto the other end surface 1011B of the light guide 1010 from the other light source 1020B gradually increases by the second increase control, becomes constant by the second maintenance control, and gradually decreases by the second decrease control.

Moreover, when the time point at which the control portion 1030 begins to increase the brightness $I_A$ of the one light source 1020A from zero by the first increase control is a first increase beginning time point t1a and the time point at which the control portion 1030 begins to increase the brightness $I_B$ of the other light source 1020B from zero by the second increase control is a second increase beginning time point t1b as shown in FIGS. 3A and 3B, the first increase beginning time point t1a is prior to the second increase beginning time point t1b.

Moreover, when the time point at which the control portion 1030 finishes increasing the brightness $I_A$ of the one light source 1020A to the first set brightness $I_1$ by the first increase control is a first increase finish time point t2a and the time point at which the control portion 1030 finishes increasing the brightness $I_B$ of the other light source 1020B to the second set brightness $I_2$ by the second increase control is a second increase finish time point t2b, the first increase finish time point t2a is simultaneous with the second increase finish time point t2b or prior to the second increase finish time point t2b.

Moreover, when the time point at which the control portion 1030 begins to decrease the brightness $I_A$ of the one light source 1020A from the first set brightness $I_1$ by the first decrease control is a first decrease beginning time point t3a and the time point at which the control portion 1030 begins to decrease the brightness $I_B$ of the other light source 1020B from the second set brightness $I_2$ by the second decrease control is a second decrease beginning time point t3b, the first decrease beginning time point t3a is simultaneous with the second decrease beginning time point t3b.

Further, the time from the first increase beginning time point t1a to the second increase finish time point t2b is not more than 0.2 seconds.

Figure 3:
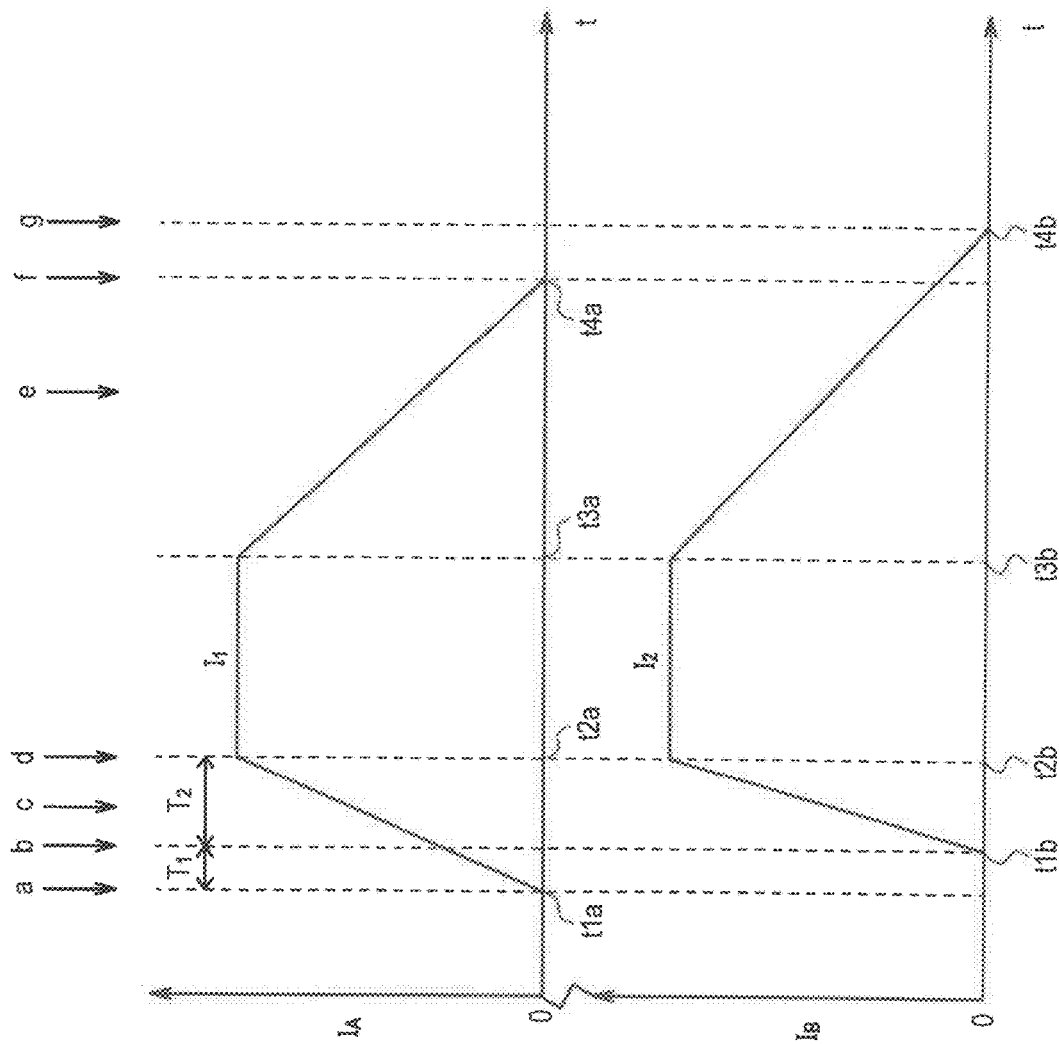
FIGS. 3A and 3B are views for explaining the lighting control of the illumination device of FIG. 1.
Figure 4:
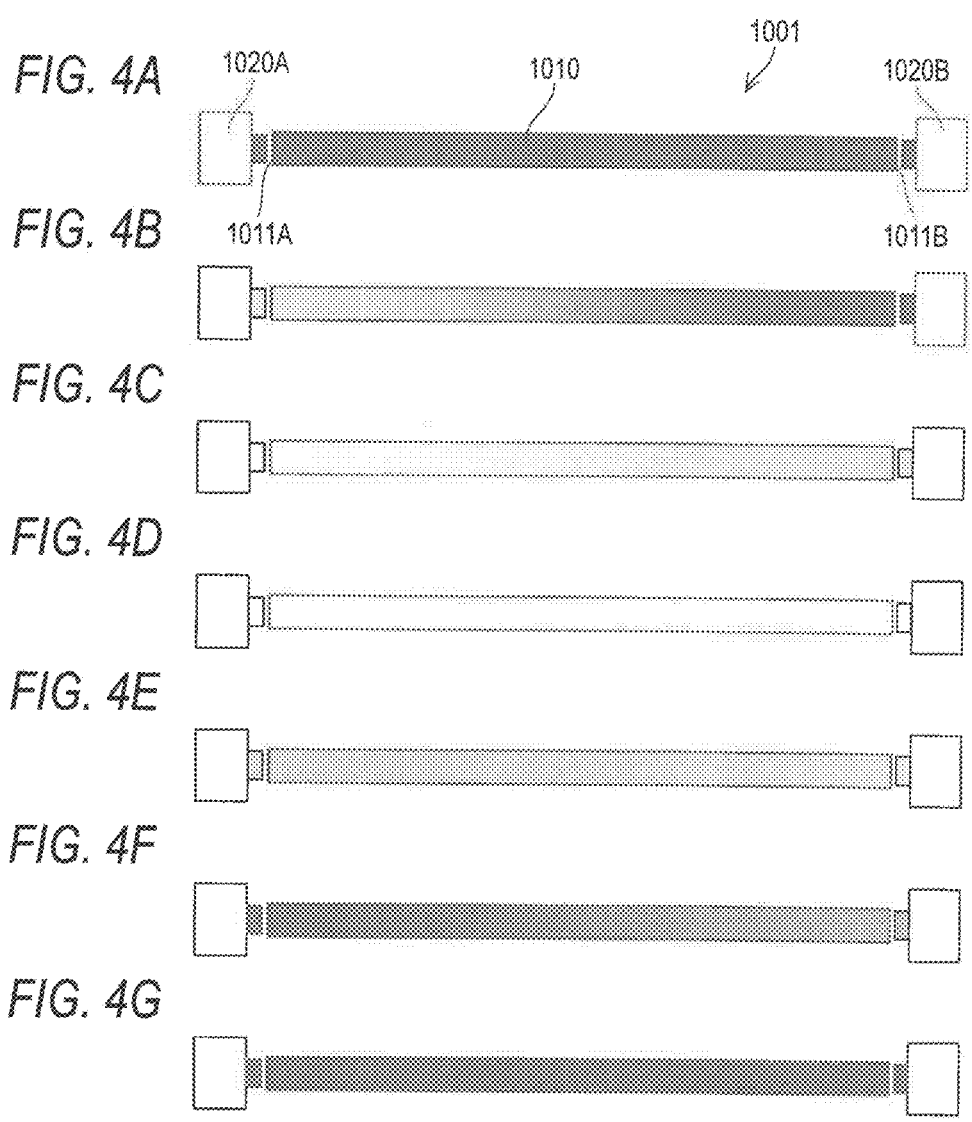
FIGS. 4A to 4G are views for explaining an example of temporal changes of the light emission mode of the illumination device of FIG. 1.

According to the above-described lighting control of the illumination device 1001, as shown at the time point t1a of FIG. 3 (that is, the time point a) and in FIG. 4A, in the initial state, the one and other light sources 1020A and 1020B are unlit, and the light guide 1010 is fully unlit.

Thereafter, the brightness $I_A$ of the one light source 1020A starts to increase by the first increase control. For example, at the second increase beginning time point t1b (the time point b), only the one light source 1020A is lit with a comparatively low brightness, and the brightness of the other light source 1020B is zero. For this reason, as shown in FIG. 4B, the light guide 1010 is visually recognized as being slightly bright on one end side, gradually becoming dark toward the other end side and being considerably dark from the middle in the direction of the length to the other end side.

At the time point c after the second increase beginning time point t1b thereafter, since the brightness $I_A$ of the one light source 1020A is higher than at the time point b and the brightness $I_B$ of the other light source 1020B has considerably increased, as shown in FIG. 4C, the light guide 1010 is visually recognized as being overall brighter than at the time point b. The increase speed of the brightness $I_A$ of the one light source 1020A in the first increase control and the increase speed of the brightness $I_B$ of the other light source 1020B in the second increase control are set so that one end side of the light guide 1010 is always visually recognized as being brighter than the other end side thereof until immediately before the second increase finish time point t2b. Therefore, at the time point c, as shown in FIG. 4C, the light guide 1010 appears to be brightest on one end side and gradually becoming dark toward the other end side. At this time, comparing with the mode of light emission of the light guide 1010 at the time point b shown in FIG. 4B, it is apparent that the part of the light guide 1010 that appears bright extends more from one end side toward the other end side.

In the present embodiment, the first increase finish time point t2a and the second increase finish time point t2b thereafter are simultaneous with each other. After the second increase finish time point t2b, since the one light source 1020A and the other light source 1020B are maintained at the first and second set brightnesses $I_1$ and $I_2$, respectively, as shown in FIG. 4D, the entire part of the light guide 1010 appears bright. While the first and second set brightnesses $I_1$ and $I_2$ may be set so that one end side and the other end side of the light guide 1010 may appear as bright as each other, the present invention is not limited thereto. The first increase finish time point t2a may be prior to the second increase finish time point t2b.

After the first decrease beginning time point t3a and the second decrease beginning time point t3b thereafter, the brightnesses $I_A$ and $I_B$ of the one light source 1020A and the other light source 1020B gradually decrease by the first decrease control and the second decrease control. The decrease speed of the brightness $I_A$ of the one light source 1020A and the decrease speed of the brightness $I_B$ of the other light source 1020B at this time are set so that one end side of the light guide 1010 is always visually recognized as being darker than the other end side thereof up to a second decrease finish time point t4b. Therefore, at the time point e after the second decrease beginning time point t3b, the light guide 1010 is visually recognized as being brightest on the other end side and gradually becoming dark toward one end side. Further, at a first decrease finish time point t4a (the time point f), since the brightness $I_A$ of the one light source 1020A is zero, one end side of the light guide 1010 is visually recognized as being darker than at the time point e, and since the brightness $I_B$ of the other light source 1020B has not become zero yet, the light guide 1010 is visually recognized as becoming slightly bright from the middle toward the neighborhood of the other end side.

At the second decrease finish time point t4b (the time point g), the one and other light sources 1020A and 1020B are unlit, and the light guide 1010 is fully unlit.

While the first decrease finish time point t4a is prior to the second decrease finish time point t4b in the present embodiment, they may be simultaneous with each other. The decrease speed of the brightness $I_A$ of the one light source 1020A and the decrease speed of the brightness $I_B$ of the other light source 1020B in the first decrease control and the second decrease control may be set so that one end side and the other end side of the light guide 1010 always appear as bright as each other. The first decrease control and the second decrease control may be ones that simultaneously and instantaneously make the brightnesses $I_A$ and $I_B$ of the one and other light sources 1020A and 1020B zero.

By the above-described lighting control of the one and other light sources 1020A and 1020B, as shown in FIGS. 4A to 4G, the part of the light guide 1010 that appears comparatively bright moves with the lapse of time from one end side to the other end side of the light guide 1010, so that an illumination effect such that light smoothly flows from one end side to the other end side of the light guide 1010 can be produced. In particular, since the time from the first increase beginning time point t1a to the second increase finish time point t2b is not more than 0.2 seconds as mentioned above, a presentation such that light appears as if flowing more smoothly can be provided.

The above-described control may be repetitively performed, and in that case, the lighting control may be successively and continuously performed by starting the first increase control of the next lighting control at the second decrease finish time point t4b which is the finish time point of the second decrease control. Moreover, an unlit time of 0.2 to 0.6 seconds may be inserted between the second decrease finish time point t4b and the start of the first increase control of the next lighting control.

While in the present embodiment, the time $T_2$ from the second increase beginning time point t1b to the second increase finish time point t2b is set so as to be approximately twice the time $T_1$ from the first increase beginning time point t1a to the second increase beginning time point t1b as shown in FIGS. 3A and 3B, the present invention is not limited thereto; any setting may be adopted as long as the sum of the time $T_1$ and the time $T_2$ is not more than 0.2 seconds.

(Modification)

Figure 5:
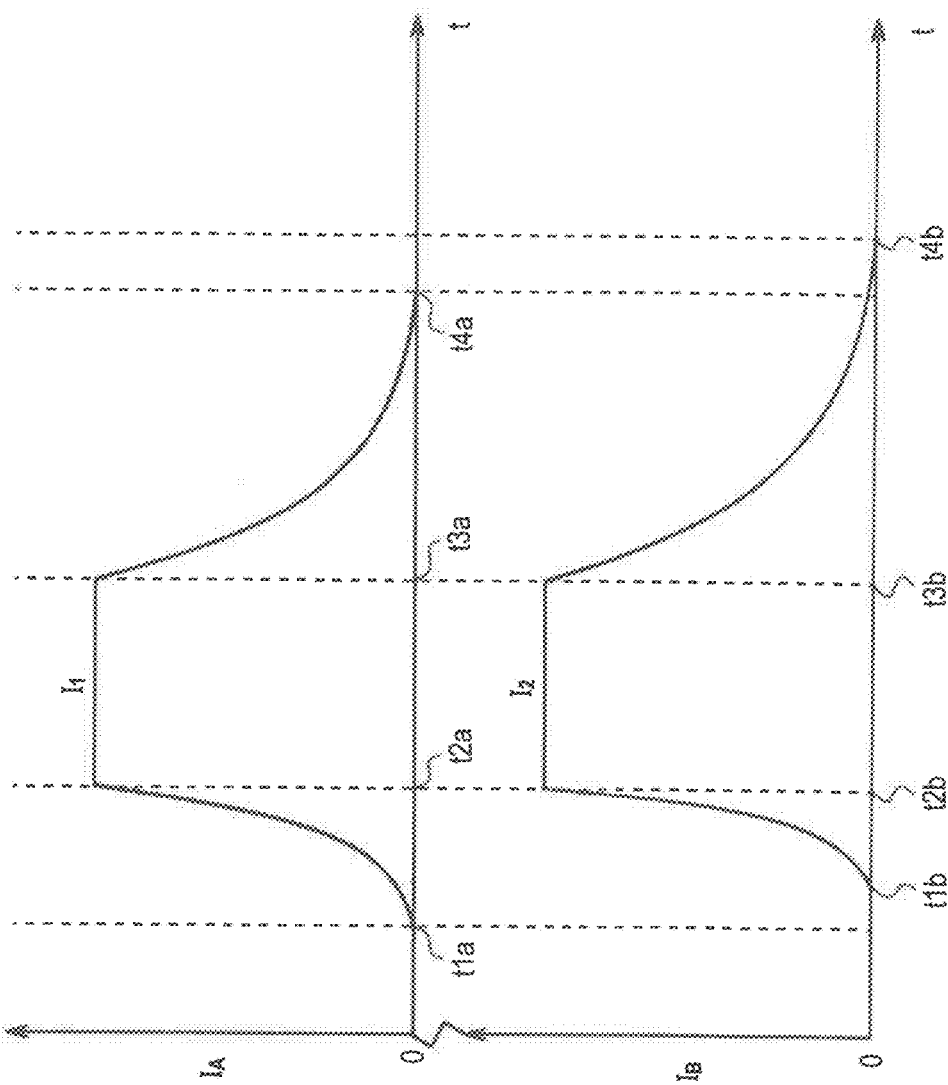
FIGS. 5A and 5B are views for explaining the lighting control by a modification of the first embodiment.

The light emitted from the one or the other light source 1020A or 1020B is considered to attenuate exponentially with respect to the travel distance inside the light guide 1010 as it travels inside the light guide 1010. For this reason, in the above-described first increase control of the lighting control of the illumination device 1001 of the first embodiment, as shown in FIG. 5A, the brightness $I_A$ of the one light source 1020A may increase exponentially with respect to the time t. Likewise, in the second increase control, as shown in FIG. 5B, the brightness $I_B$ of the other light source 1020B may increase exponentially with respect to the time t. Thereby, a presentation can be provided such that light appears as if flowing linearly (that is, flowing at a substantially constant speed) with the lapse of time t from one end side to the other end side of the light guide 1010 in the direction of the length. Moreover, the same applies to the decrease control.

Second Embodiment

Next, an example in which the illumination device 1001 of the present invention is applied to a turn lamp of a vehicle such as a car will be described with reference to FIG. 6. The turn lamp is attached to front right and left positions, rear right and left positions and other positions of a vehicle such as a car to indicate a travel direction change of the vehicle by lighting. In the present embodiment, the control portion 1030 may be an ECU (electronic control unit) for controlling operations of various electric components of the vehicle or may be structured so as to perform lighting control of the illumination device 1001 based on a passenger's operation or the like.

Figure 6:
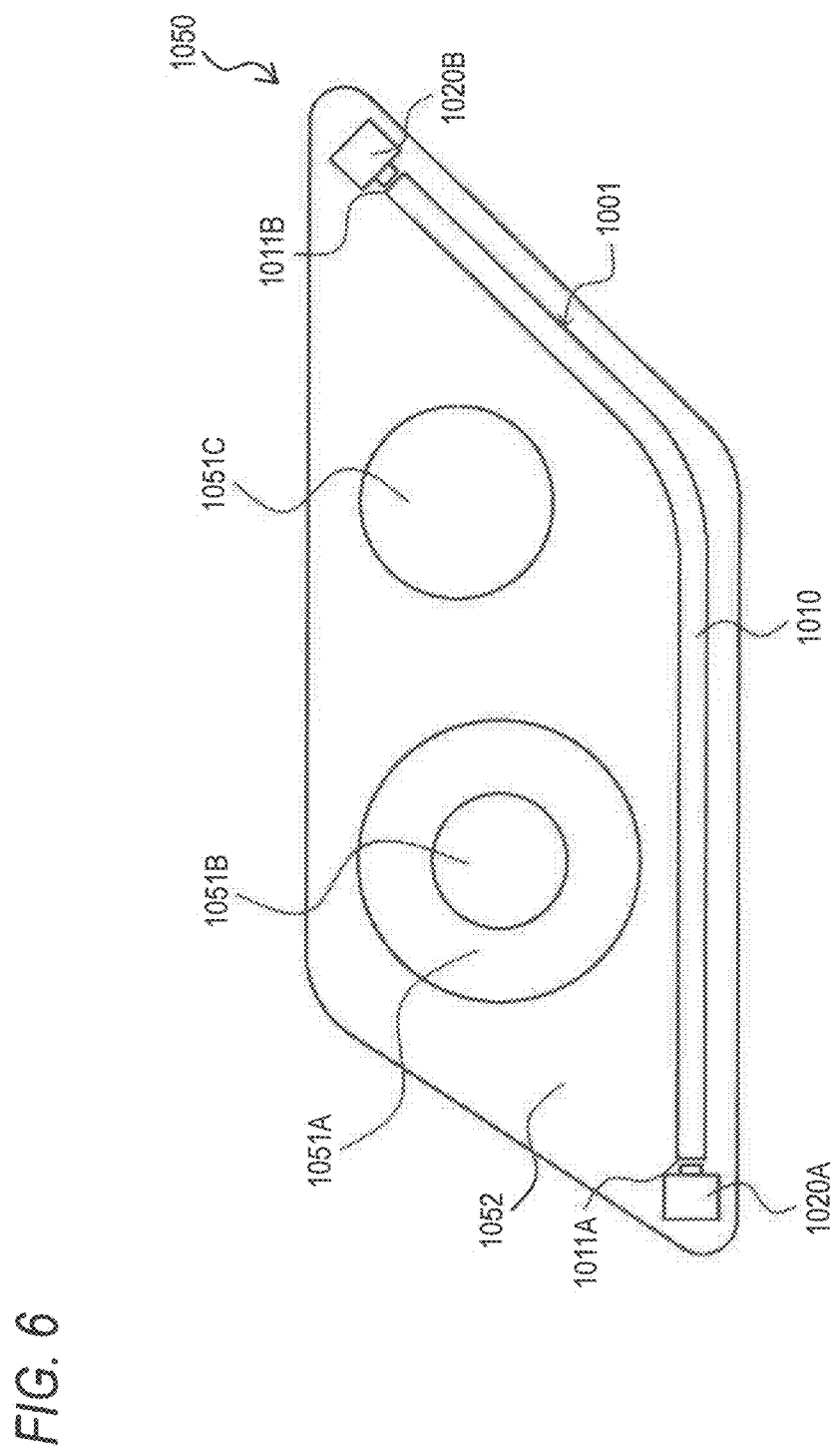
FIG. 6 is a schematic view for explaining the structure of a turn lamp according to a second embodiment of the present invention.

FIG. 6 is a view illustrating a rear combination lamp 1050 attached to the rear right side of the body of a car as an example of an automotive lamp body unit including the illumination device 1001 as a turn lamp according to the present embodiment, and is a schematic view of the rear combination lamp 1050 viewed from behind the car. The rear combination lamp 1050 is provided with the illumination device 1001 as a turn lamp, a plurality of lamp bodies 1051A to 1051C (for example, any of tail lamps, brake lamps, lamps serving also as them, and back lamps), a casing 1052 facing inside the vehicle body, and a resin cover (not shown) fitted on the outer periphery of the casing 1052 to serve as the obverse side of the rear combination lamp 1050. The casing 1052 is made of a resin material such as a polypropylene (PP) or acrylonitrile butadiene styrene copolymer resin (ABS). The lighting condition of the light guide 1010 of the illumination device 1001 and the lamp bodies 1051A to 1051C can be visually recognized from outside through the resin cover.

When the vehicle body is viewed from behind, one end (the end portion on the side of the one end surface 1011A of FIG. 6) of the light guide 1010 of the illumination device 1001 is disposed on the center side of the vehicle body in the horizontal direction, and the other end (the end portion on the side of the other end surface 1011B of FIG. 6) of the light guide 1010 is disposed on the outer periphery side of the vehicle body in the horizontal direction. That is, when the vehicle body is viewed from behind, the other end of the light guide 1010 is situated on the right side of the one end thereof. For this reason, when the lighting control of the illumination device 1001 described based on FIGS. 3A and 3B, 4A to 4G or 5A and 5B is performed, light appears as if flowing from the left side end portion toward the right side end portion of the light guide 1010 when viewed from behind the vehicle body. By this illumination mode, when the right side turn lamp (the illumination device 1001) is lit, a presentation can be provided such that light flows in the direction of the length of the light guide 1010 toward the right side which is the travel direction change direction of the car, so that an external observer can be more clearly notified of the travel direction change direction of the car.

The visibility of the lighting condition of the light guide 1010 may be enhanced by disposing a reflector between the light guide 1010 and the casing 1052. The light guide 1010 may turn around up to the side surface of the vehicle body.

When the illumination device 1001 of the present invention is used as a turn lamp of a car as in the present embodiment, it can be shown as an example that the length of the light guide 1010 is within a range of approximately 200 mm to 500 mm. Moreover, it can be shown as an example that the emission color of the one and other light sources 1020A and 1020B and the light guide 1010 is amber.

Moreover, in the above-described lighting control, it is preferable that the time from the first increase beginning time point t1$a$ to the second decrease finish time point t4$b$ be within a range of 0.25 seconds to one second. Moreover, it is preferable that the time from the second decrease beginning time point t3$b$ to the second decrease finish time point t4$b$ be not more than 0.5 seconds. This is because an illumination effect such that light appears as if flowing smoothly from one end side toward the other end side of the light guide 1010 can be produced more suitably.

Moreover, it is preferable that the time from the second increase finish time point t2$b$ to the second decrease beginning time point t3$b$ be not less than 0.05 seconds. This is in order to sufficiently secure the time to maintain the one and other light sources 1020A and 1020B at the first and second set brightnesses $I_1$ and $I_2$, respectively.

A rear combination lamp for the left side symmetrical to the rear combination lamp 1050 of FIG. 6 may be disposed on the rear left side of the vehicle body, and when the lighting control of the illumination device 1001 described based on FIGS. 3A and 3B, 4A to 4G or 5A and 5B is performed for the rear combination lamp for the left side, an illumination effect is obtained such that light appears as if flowing from the right side end portion toward the left side end portion of the light guide 1010 when viewed from behind the vehicle body. Similar lighting control may be performed while the illumination device 1001 according to the present invention is used as the turn lamps on both front right and left sides of the vehicle body.

When the illumination device 1001 as a turn lamp is lit as a hazard lamp, the lighting control of the illumination device 1001 shown in FIGS. 3A and 3B, 4A to 4G or 5A and 5B may be performed.

(Modification)

In addition to the usage as a turn lamp, the illumination device 1001 of the present invention may also be used as lamps provided in the cabin such as a room lamp provided on the roof trim of the vehicle to illuminate the entire area inside the cabin, a scuff lamp provided at the foot side of the door opening portion and emitting light upward when the door is opened and closed, a foot lamp provided in a lower part of the instrument panel to illuminate the feet of a passenger on a front seat, and a door pocket lamp provided inside the door pocket of the door trim and emitting light upward from inside the door pocket. Further, not only for usages on vehicles but the present invention may be used for various usages as required such as a traffic signal, an advertisement display lamp, a warning indicator lamp, illumination for a building or a garden and an advertising balloon lamp.

Third Embodiment

Figure 7:
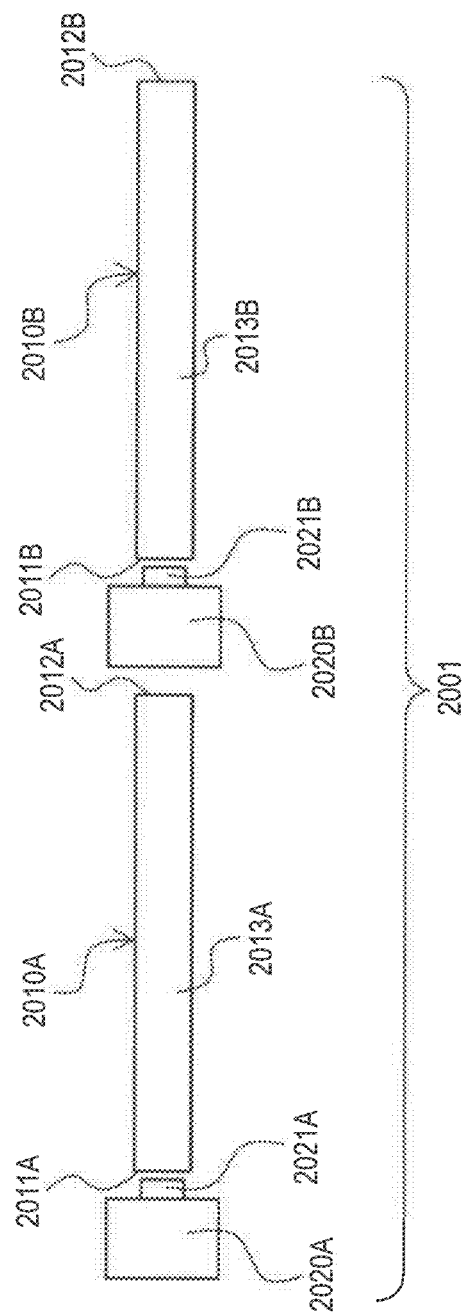
FIG. 7 is a schematic front view for explaining the structure of an illumination device according to a third embodiment of the present invention.
Figure 8:
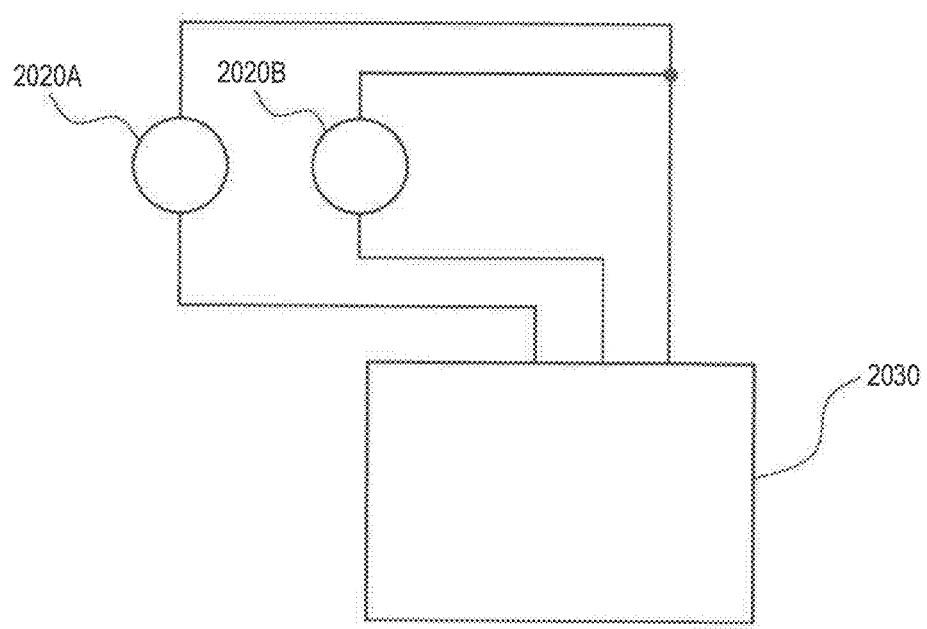
FIG. 8 is a schematic block diagram of the electric circuit configuration of the illumination device of FIG. 7.

FIG. 7 is a schematic front view for explaining the structure of an illumination device 2001 according to a third embodiment of the present invention. FIG. 8 is a schematic block diagram of the electric circuit configuration of the illumination device 2001. As shown in FIGS. 7 and 8, the illumination device 2001 has an elongated first light guide 2010A and an elongated second light guide 2010B, and they are disposed in series with each other in the direction of the length. The illumination device 2001 further has a first light source 2020A provided on the side of one end surface 2011A in the direction of the length of the first light guide 2010A on the side farther from the second light guide 2010B and a second light source 2020B provided on the side of one end surface 2011B in the direction of the length of the second light guide 2010B on the side closer to the first light guide 2010A. The illumination device 2001 is further provided with a control portion 2030 that performs lighting control of the first and second light sources 2020A and 2020B.

(Light Guide)

The first and second light guides 2010A and 2010B are made of a transparent flexible resin material such as fluorine resin, a transparent rigid resin material such as polymethyl methacrylate resin (PMMA resin), polycarbonate resin (PC resin), cyclic polyolefin resin (COP resin) or acrylic resin, or a transparent flexible material or rigid material such as a transparent glass material.

While the first and second light guides 2010A and 2010B illustrated in FIG. 7 may be formed as columnar members having a circular transverse cross section, the shape of the transverse cross section of the first and second light guides 2010A and 2010B is not limited to a circle but may be a shape such as an ellipse or a polygon. The first and second light guides 2010A and 2010B are not limited to the columnar ones as long as they are elongated members and may have a configuration such that the area and shape of the transverse cross section change in the direction of the length. The first and second light guides 2010A and 2010B may be bent in the middle in the direction of the length. The first and second light guides 2010A and 2010B may be arranged along any of a straight line, a bent line and a curved line. As shown in FIG. 7, the other end (a part in the neighborhood of the other end surface 2012A on the side opposite to the one end surface 2011A) of the first light guide 2010A and one end (a part in the neighborhood of one end surface 2011B) of the second light guide 2010B are disposed close to each other, and the second light source 2020B is disposed therebetween.

The one end surface 2011A of the first light guide 2010A functions as an incident surface where light from the first light source 2020A is incident. Moreover, the one end surface 2011B of the second light guide 2010B functions as an incident surface where light from the second light source 2020B is incident. The light incident into the first light guide 2010A from the one end surface 2011A of the first light guide 2010A travels inside the first light guide 2010A while repetitively reflecting at a peripheral surface 2013A of the first light guide 2010A. In the process of traveling inside the first light guide 2010A, light leaks little by little from the peripheral surface 2013A when part of the light exceeds a critical angle. For this reason, the peripheral surface 2013A functions as a light exit surface from the entire area of which light leaks. Likewise, a peripheral surface 2013B of the second light guide 2010B functions as a light exit surface from the entire area of which the light from the second light source 2020B leaks.

The first and second light guides 2010A and 2010B may be made to leak light by some processing or the like, or may contain a light diffusing material. In this case, light diffuses multidirectionally inside the first and second light guides 2010A and 2010B so that it easily impinges on the peripheral surfaces 2013A and 2013B, which makes the light easy to leak. The light diffusing material only necessarily has the property of diffusing and reflecting light, and as the light diffusing material, for example, a conventional general material such as titanium oxide may be used.

(Light Source)

The first light source 2020A has an LED 2021A, and the second light source 2020B has an LED 2021B. Instead of the LEDs 2021A and 2021B, known light sources such as EL (electro luminescence) elements, incandescent light bulbs, halogen lamps or cold-cathode tubes may be adopted. The light emitted from the first and second light sources 2020A and 2020B may be of any color. As shown in FIG. 8, the first and second light sources 2020A and 2020B are electrically connected to the control portion 2030 provided with a control circuit.

(Control Portion)

The control portion 2030 is capable of performing lighting control in a mode of temporally and continuously changing the brightness of each of the first and second light sources 2020A and 2020B by known dimming control means such as the phase control dimming method in which supplied power is adjusted or the PWM (pulse width modulation) light control method in which lighting and unlighting are caused to be repeated based on a PWM signal in addition to the control to maintain the brightness of the first and second light sources 2020A and 2020B constant.

(Lighting Control)

Next, an example of the lighting control of the illumination device 2001 performed by the control portion 2030 according to the present embodiment will be described based also on FIGS. 9A to 10G in addition to FIGS. 7 and 8. FIG. 9A is an explanatory view showing the mode of control of the brightness $I_A$ of the first light source 2020A of the illumination device 2001 with the horizontal axis representing the time t. FIG. 9B is an explanatory view showing the mode of control of the brightness $I_B$ of the second light source 2020B of the illumination device 2001 with the horizontal axis representing the time t. FIGS. 10A to 10G are explanatory views schematically showing an example of temporal changes of the light emission mode of the illumination device 2001 by the lighting control of FIGS. 9A and 9B. The light emission modes of the illumination device 2001 at the time points a to g of FIGS. 9A and 9B are schematically shown in FIG. 10A to 10G, respectively.

The lighting control performed by the control portion 2030 for the first light source 2020A includes, as shown in FIG. 9A, a first increase control to gradually increase the brightness $I_A$ of the first light source 2020A from zero to a first set brightness $I_1$, a first maintenance control to maintain the brightness $I_A$ of the first light source 2020A at the first set brightness $I_1$ subsequently to the first increase control, and a first decrease control to gradually decrease the brightness $I_A$ of the first light source 2020A from the first set brightness $I_1$ to zero subsequently to the first maintenance control. Thereby, the amount of light projection onto the one end surface 2011A of the first light guide 2010A from the first light source 2020A gradually increases by the first increase control, becomes constant by the first maintenance control, and gradually decreases by the first decrease control.

Moreover, the lighting control performed by the control portion 2030 for the second light source 2020B includes, as shown in FIG. 9B, a second increase control to gradually increase the brightness $I_B$ of the second light source 2020B from zero to a second set brightness $I_2$, a second maintenance control to maintain the brightness $I_B$ of the second light source 2020B at the second set brightness $I_2$ subsequently to the second increase control, and a second decrease control to gradually decrease the brightness $I_B$ of the second light source 2020B from the second set brightness $I_2$ to zero subsequently to the second maintenance control. Thereby, the amount of light projection onto the other end surface 2011B of the second light guide 2010B from the second light source 2020B gradually increases by the second increase control, becomes constant by the second maintenance control, and gradually decreases by the second decrease control Moreover, when the time point at which the control portion 2030 begins to increase the brightness $I_A$ of the first light source 2020A from zero by the first increase control is a first increase beginning time point t1a and the time point at which the control portion 2030 begins to increase the brightness $I_B$ of the second light source 2020B from zero by the second increase control is a second increase beginning time point t1b as shown in FIGS. 9A and 9B, the first increase beginning time point t1a is prior to the second increase beginning time point t1b.

Moreover, when the time point at which the control portion 2030 finishes increasing the brightness $I_A$ of the first light source 2020A to the first set brightness $I_1$ by the first increase control is a first increase finish time point t2a and the time point at which the control portion 2030 finishes increasing the brightness $I_B$ of the second light source 2020B to the second set brightness $I_2$ by the second increase control is a second increase finish time point t2b, the first increase finish time point t2a is prior to the second increase finish time point t2b.

The second increase beginning time point t1b is prior to or simultaneous with the first increase finish time point t2a.

Moreover, when the time point at which the control portion 2030 begins to decrease the brightness $I_A$ of the first light source 2020A from the first set brightness $I_1$ by the first decrease control is a first decrease beginning time point t3a and the time point at which the control portion 2030 begins to decrease the brightness $I_B$ of the second light source 2020B from the second set brightness $I_2$ by the second decrease control is a second decrease beginning time point t3b, the first decrease beginning time point t3a is simultaneous with the second decrease beginning time point t3.

Further, the time from the first increase beginning time point t1a to the second increase finish time point t2b is not more than 0.2 seconds.

Figure 10A:
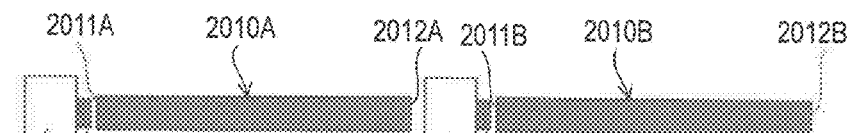
FIG. 10A to 10G are views for explaining an example of temporal changes of the light emission mode of the illumination device of FIG. 7.

According to the above-described lighting control of the illumination device 2001, as shown at the time point t1a of FIG. 9A (that is, the time point a) and in FIG. 10A, in the initial state, the first and second light sources 2020A and 2020B are unlit, and the first and second light guides 2010A and 2010B are fully unlit.

Figure 10B:
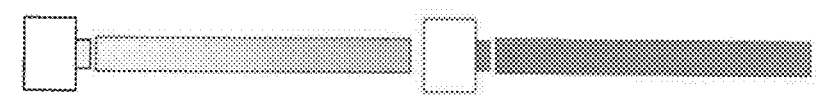

Thereafter, the brightness $I_A$ of the first light source 2020A starts to increase by the first increase control. For example, at the second increase beginning time point t1b (the time point b), only the first light source 2020A is lit with a certain level of brightness, and the brightness $I_B$ of the second light source 2020B is zero. For this reason, as shown in FIG. 10B, the first light guide 2010A is visually recognized as being bright to some extent on one end side and gradually becoming dark toward the other end side, and the second light guide 2010B is visually recognized as being overall dark.

Figure 10C:

At the first increase finish time point t2a (the time point c) thereafter, since the brightness $I_A$ of the first light source 2020A is the first set brightness $I_1$ which is higher than at the time point b and the brightness $I_B$ of the second light source 2020B is increased to some extent, as shown in FIG. 10C, the first light guide 2010A is visually recognized as being overall bright or as being overall bright and slightly dark only in the neighborhood of the other end, and the second light guide 2010B is visually recognized as being bright to some extent on one end side and gradually becoming dark toward the other end side. At this time, comparing with the mode of light emission of the first light guide 2010A at the time point b shown in FIG. 10B, it is apparent that the part of the first light guide 2010A that appears bright is more extended from one end side toward the other end side. The increase speed of the brightness $I_A$ of the first light source 2020A in the first increase control and the increase speed of the brightness $I_B$ of the second light source 2020B in the second increase control are set so that the other end side of the first light guide 2010A is always visually recognized as being brighter than one end side of the second light guide 2010B until the first increase finish time point t2a.

Figure 10D:
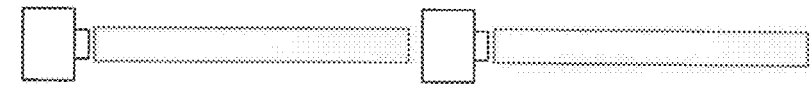
Figure 10E:
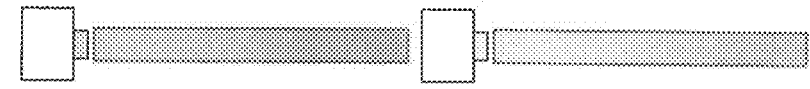
Figure 10F:
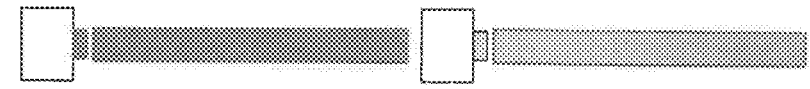
Figure 10G:
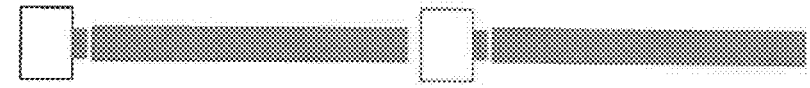

At the second increase finish time point t2b thereafter, in addition to the first light guide 2010A, the second light guide 2010B is also visually recognized as being overall bright or as being overall bright and slightly dark only in the neighborhood of the other end side. Since the first light source 2020A and the second light source 2020B are maintained at the first and second set brightnesses $I_1$ and $I_2$, respectively, after the second increase finish time point t2b, as shown in FIG. 10D, the first and second light guides 2010A and 2010B appear overall or substantially overall bright. While the first and second set brightnesses $I_1$ and $I_2$ may be set so that the first and second light guides 2010A and 2010B appear as bright as each other, the present invention is not limited thereto.

After the first decrease beginning time point t3a and the second decrease beginning time point t3b thereafter, the brightnesses $I_A$ and $I_B$ of the first light source 2020A and the second light source 2020B gradually decrease by the first decrease control and the second decrease control. The decrease speed of the brightness $I_A$ of the first light source 2020A and the decrease speed of the brightness $I_B$ of the second light source 2020B at this time are set so that the other end side of the first light source 2020A is always visually recognized as being darker than one end side of the second light guide 2010B up to the second decrease finish time point t4b. Therefore, at the time point e after the second decrease beginning time point t3b, one end side of the second light guide 2010B is visually recognized as being brighter than the other end side of the first light guide 2010A and gradually becoming dark toward the other end side of the second light guide 2010B. Further, at the first decease finish time point t4a (the time point f), since the brightness $I_A$ of the first light source 2020A is zero, the first light guide 2010A is visually recognized as being overall dark, and since the brightness $I_B$ of the second light source 2020B has not become zero yet, the second light guide 2010B is visually recognized as being slightly bright at one end side and gradually becoming dark toward the other end side.

At the second decrease finish time point t4B (that is, the time point g), the first and second light sources 2020A and 2020B are unlit, and the first and second light guides 2010A and 2010B are fully unlit.

While the first decrease finish time point t4a is prior to the second decrease finish time point t4b in the present embodiment, they may be simultaneous with each other. The decrease speed of the brightness $I_A$ of the first light source 2020A and the decrease speed of the brightness $I_B$ of the second light source 2020B in the first decrease control and the second decrease control may be set so that the other end side of the first light guide 2010A and one end side of the second light guide 2010B always appear as bright as each other. The first decrease control and the second decrease control may be ones that simultaneously and instantaneously make the brightnesses $I_A$ and $I_B$ of the first and second light sources 2020A and 2020B zero.

By the above-described lighting control of the first and second light sources 2020A and 2020B, as shown in FIGS. 10A to 10G, the parts of the first and second light guides 2010A and 2010B that appear comparatively bright move with the lapse of time from one end side of the first light guide 2010A to the other end side of the second light guide 2010B, so that an illumination effect such that light smoothly flows from one end side of the first light guide 2010A to the other end side of the second light guide 2010B can be produced. In particular, since the time from the first increase beginning time point t1a to the second increase finish time point t2b is not more than 0.2 seconds as mentioned above, a presentation such that light appears as if flowing more smoothly can be provided.

The above-described control may be repetitively performed, and in that case, the lighting control may be successively and continuously performed by starting the first increase control of the next lighting control at the second decrease finish time point t4b which is the finish time point of the second decrease control. Moreover, an unlit time of 0.2 to 0.6 seconds may be inserted between the second decrease finish time point t4b and the start of the first increase control of the next lighting control.

(Modification)

The light emitted from the first light source 2020A is considered to attenuate exponentially with respect to the travel distance inside the first light guide 2010A as it travels inside the first light guide 2010A. The same applies to the second light source 2020B and the second light guide 2010B. For this reason, in the above-described first increase control of the lighting control of the illumination device 2001 of the third embodiment, as shown in FIG. 11A, the brightness $I_A$ of the first light source 2020A may increase exponentially with respect to the time t. Likewise, in the second increase control, as shown in FIG. 11B, the brightness $I_B$ of the second light source 2020B may be increased exponentially with respect to the time t. Thereby, a presentation can be provided such that light appears as if flowing linearly (that is, flowing at a substantially constant speed) with the lapse of time t from one end side of the first light guide 2010A to the other end side of the second light guide 2010B. Moreover, the same applies to the decrease control.

Fourth Embodiment

Next, an example in which the illumination device 2001 of the present invention is applied to a turn lamp of a vehicle such as a car will be described with reference to FIGS. 12A, 12B and 13. The turn lamp is attached to front right and left positions, rear right and left positions and other positions of a vehicle such as a car to indicate a travel direction change of the vehicle by lighting. In the present embodiment, the control portion 2030 may be an ECU (electronic control unit) for controlling operations of various electric components of the vehicle or may be structured so as to perform lighting control of the illumination device 2001 based on a passenger's operation or the like.

Figure 12A:
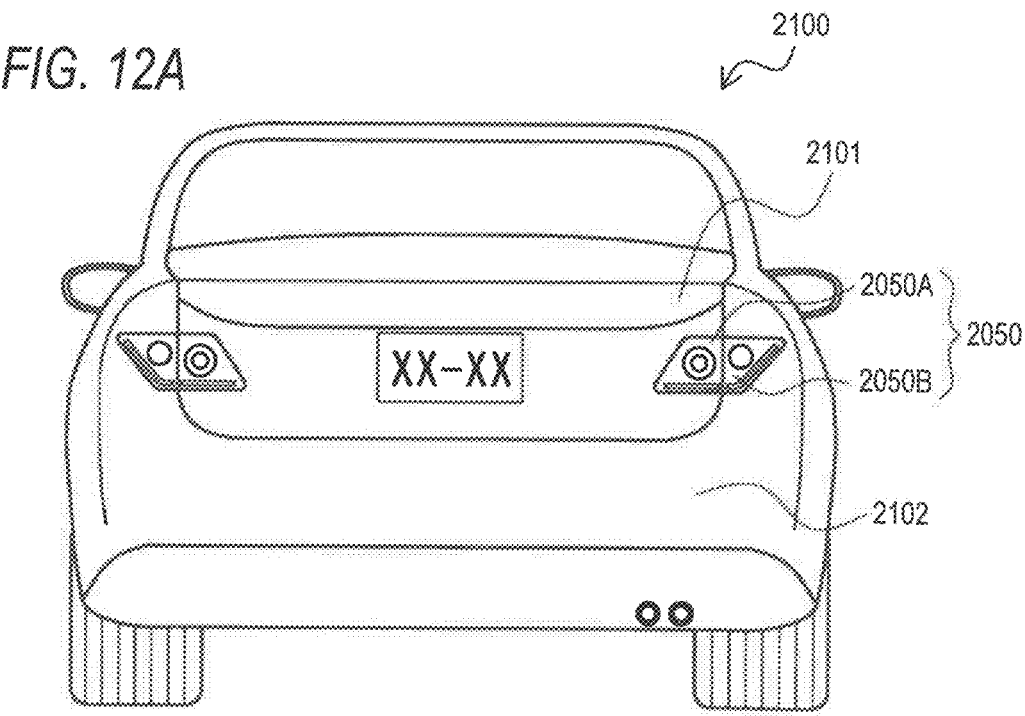
FIGS. 12A and 12B are schematic views showing a rear part of a car provided with a turn lamp according to a fourth embodiment of the present invention.
Figure 12B:
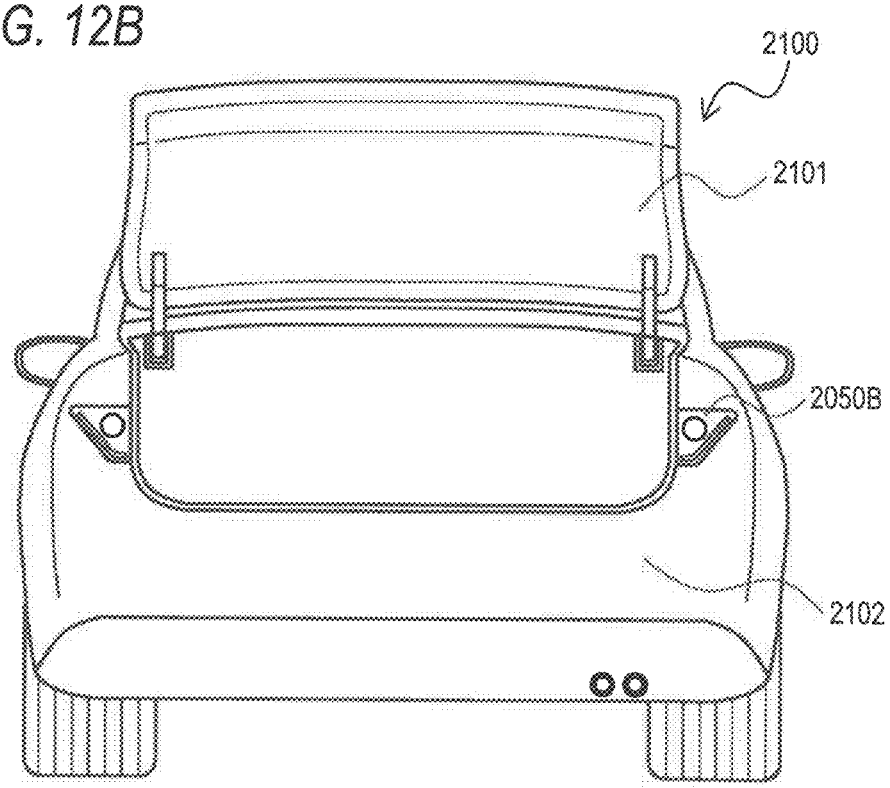

FIGS. 12A and 12B are views illustrating a car 2100 having a rear combination lamp 2050 attached to the rear right side of the car body as an example of an automotive lamp unit including the illumination device 2001 as a turn lamp according to the present embodiment, and is a schematic view of the car 2100 viewed from behind. FIG. 12A shows a condition where a trunk room lid 2101 of the car 2100 is closed, and FIG. 12B shows a condition where the trunk room lid 2101 is opened. FIG. 13 is a view where only the right side rear combination lamp 2050 is taken out and shown.

As illustrated, the right side rear combination lamp 2050 is formed of two portions of a first portion 2050A disposed on the rear surface of the trunk room lid 2101 and a second portion 2050B disposed on the rear surface of a body 2102 of the car 2100. The first portion 2050A is provided with the first light guide 2010A, the first light source 2020A, lamp bodies 2511 and 2512 (for example, any of tail lamps, brake lamps, lamps serving also as them, and back lamps), a first casing 2052A facing inside the vehicle body, and a resin cover (not shown) fitted on the outer periphery of the first casing 2052A to serve as the obverse side of the first portion 2050A. The second portion 2050B is provided with the second light guide 2010B, the second light source 2020B, a lamp body 2513 (for example, any of a brake lamp, a back lamp and a position lamp), a second casing 2052B facing inside the vehicle body, and a resin cover (not shown) fitted on the outer periphery of the second casing 2052B to serve as the obverse side of the second portion 2050B. The first and second light guides 2010A and 2010B and the first and second light sources 2020A and 2020B shown in FIG. 13, and the control portion 2030 shown in FIG. 9 constitute the illumination device 2001.

The first and second casings 2052A and 2052B are made of a resin material such as polypropylene (PP) or acrylonitrile butadiene styrene copolymer resin (ABS). The lighting conditions of the first and second light guides 2010A and 2010B and the lamp bodies 2511 to 2513 can be visually recognized from outside through the resin cover.

As shown in FIG. 12A, under a condition where the trunk room lid 2101 is closed, the first portion 2050A and the second portion 2050B adjoin each other, the first light guide 2010A and the second light guide 2010B are arranged in series, and the other end of the first light guide 2010A and one end of the second light guide 2010B are close to each other.

Figure 13:
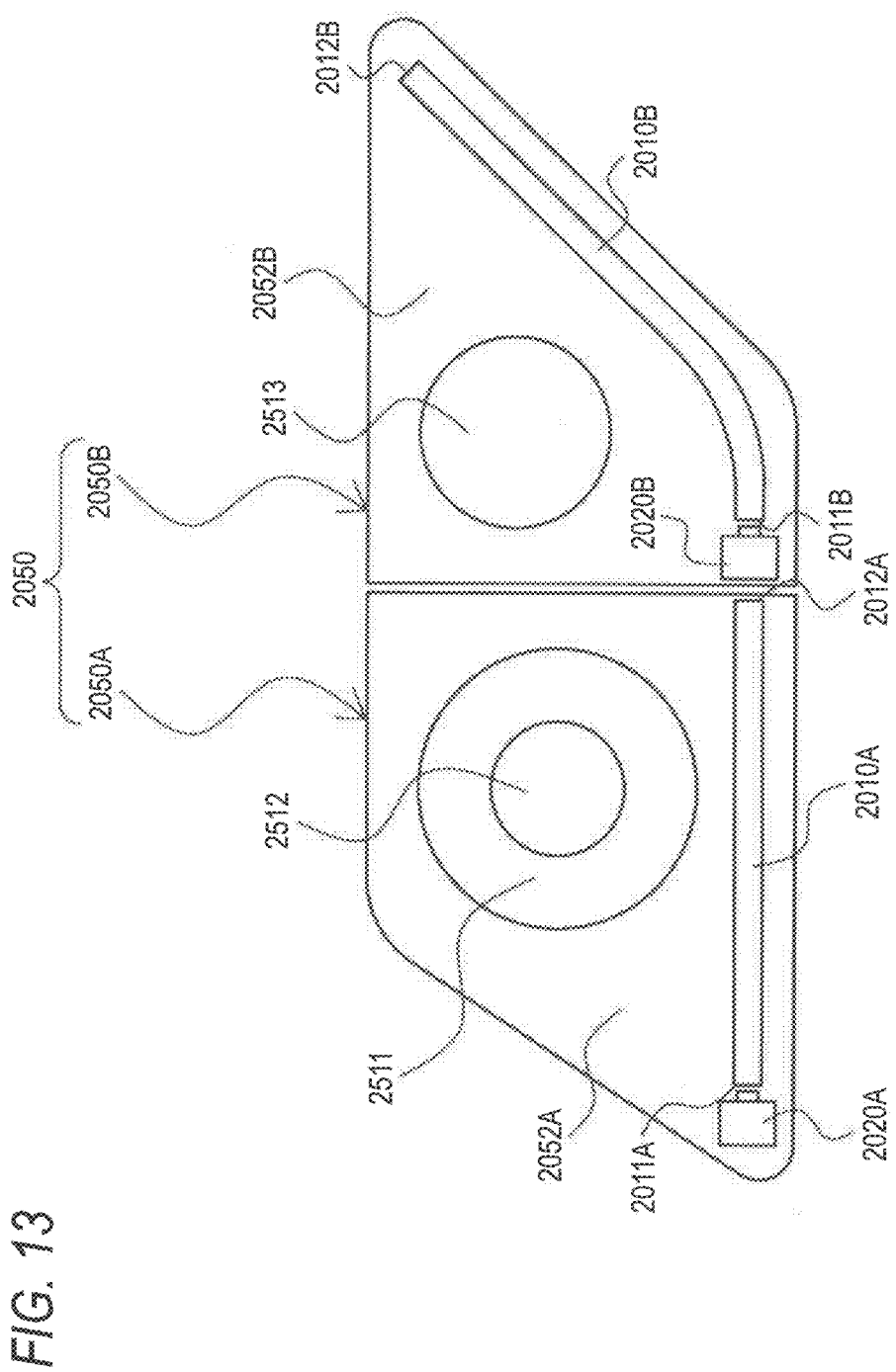
FIG. 13 is a schematic view for explaining the structure of a turn lamp according to a fourth embodiment.

When the vehicle body is viewed from behind, one end (the end portion on the side of the one end surface 2011A of FIG. 13) of the first light guide 2010A of the illumination device 2001 is disposed on the center side of the vehicle body in the horizontal direction, and the other end (the end portion on the side of the other end surface 2012B opposite to the one end surface 2011B of FIG. 13) of the second light guide 2010B is disposed on the outer periphery side of the vehicle body in the horizontal direction. That is, when the vehicle body is viewed from behind, the other end of the second light guide 2010B is situated on the right side of one end of the first light guide 2010A. For this reason, when the lighting control of the illumination device 2001 described based on FIGS. 9A and 9B, 10A to 10G or 11A and 11B is performed, light appears as if flowing from the left side end portion of the first light guide 2010A toward the right side end portion of the second light guide 2010B when viewed from behind the vehicle body. By this illumination mode, when the right side turn lamp (the illumination device 2001) is lit, a presentation can be provided such that light flows in the direction of the length of the first and second light guides 2010A and 2010B toward the right side which is the travel direction change direction of the car, so that an external observer can be more clearly notified of the travel direction change direction of the car.

The visibility of the lighting conditions of the first and second light guides 2010A and 2010B may be enhanced by disposing a reflector between the first light guide 2010A and the first casing 2052A and between the second light guide 2010B and the second casing 2052B.

The second light guide 2010B may turn around up to the side surface of the vehicle body.

When the illumination device 2001 of the present invention is used as a turn lamp of a car as in the present embodiment, it can be shown as an example that the length from one end of the first light guide 2010A to the other end of the second light guide 2010B is within a range of approximately 200 mm to 500 mm. Moreover, it can be shown as an example that the emission color of the first and second light sources 2020A and 2020B and the first and second light guides 2010A and 2010B is amber.

Moreover, in the above-described lighting control, it is preferable that the time from the first increase beginning time point t1$a$ to the second decrease finish time point t4$b$ be within a range of 0.25 seconds to one second. Moreover, it is preferable that the time from the second decrease beginning time point t3$b$ to the second decrease finish time point t4$b$ be not more than 0.5 seconds. This is because an illumination effect such that light appears as if flowing smoothly from one end side of the first light guide 2010A toward the other end side of the second light guide 2010B can be produced more suitably.

Moreover, it is preferable that the time from the second increase finish time point t2$b$ to the second decrease beginning time point t3$b$ be not less than 0.05 seconds. This is in order to sufficiently secure the time to maintain the first and second light sources 2020A and 2020B at the first and second set brightnesses $I_1$ and $I_2$, respectively.

A rear combination lamp for the left side symmetrical to the rear combination lamp 2050 of FIG. 13 may be disposed on the rear left side of the vehicle body as shown in FIGS. 12A and 12B. When the lighting control of the illumination device 2001 described based on FIGS. 9A and 9B, 10A to 10G or 11A and 11B is performed for the rear combination lamp for the left side, an illumination effect such that light appears as if flowing from the right side end portion of the first light guide 2010A toward the left side end portion of the second light guide 2010B is obtained when viewed from behind the vehicle body. Similar lighting control may be performed while the illumination device 2001 according to the present invention is used as the turn lamps on both front right and left sides of the vehicle body.

When the illumination device 2001 as a turn lamp is lit as a hazard lamp, the lighting control shown in FIGS. 9A and 9B, 10A to 10G or 11A and 11B may be performed.

The lighting control shown in FIGS. 9A and 9B, 10A to 10G or 11A and 11B may be performed irrespective of whether the trunk room lid 2101 is opened or closed.

Fifth Embodiment

Figure 14:
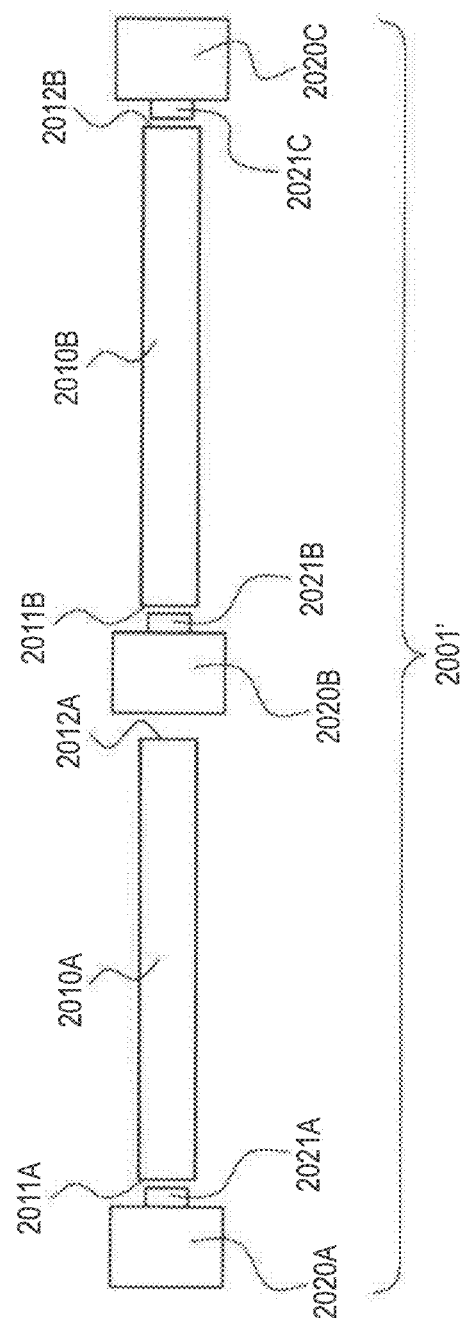
FIG. 14 is a schematic front view for explaining the structure of an illumination device according to a fifth embodiment of the present invention.

Next, an illumination device 2001' according to a fifth embodiment of the present invention will be described with reference to FIGS. 14 to 16C. FIG. 14 is a schematic front view for explaining the structure of the illumination device 2001' according to the fifth embodiment of the present invention. As shown in FIG. 14, the illumination device 2001' of the present embodiment corresponds to one in which a third light source 2020C is further added to the illumination device 2001 of the third embodiment shown in FIG. 7. The third light source 2020C is disposed on the side of the other end surface 2012B of the second light guide 2010B, and applies light to the other end surface 2012B of the second light guide 2010B. That is, the other end surface 2012B of the second light guide 2010B functions as a light incident surface where light from the third light source 2020C is incident.

Figure 15:
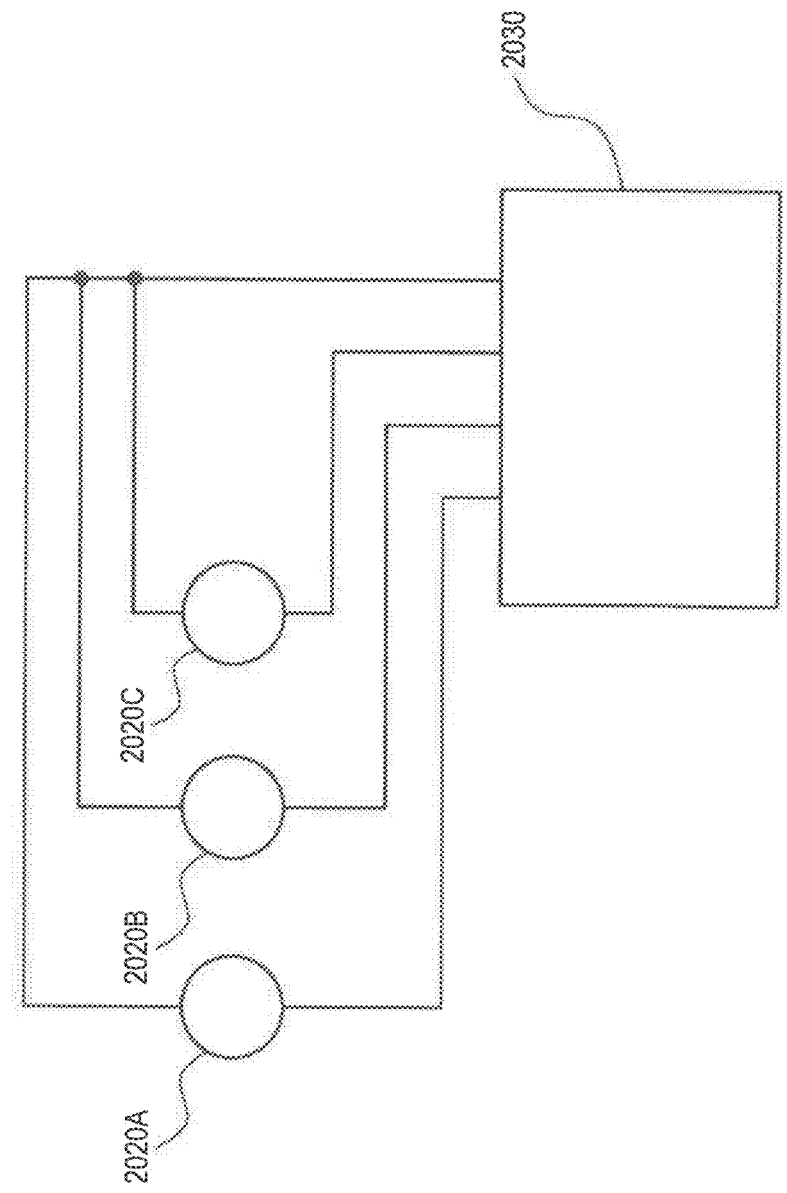
FIG. 15 is a schematic block diagram of the electric circuit configuration of the illumination device of FIG. 14.
Figure 16:
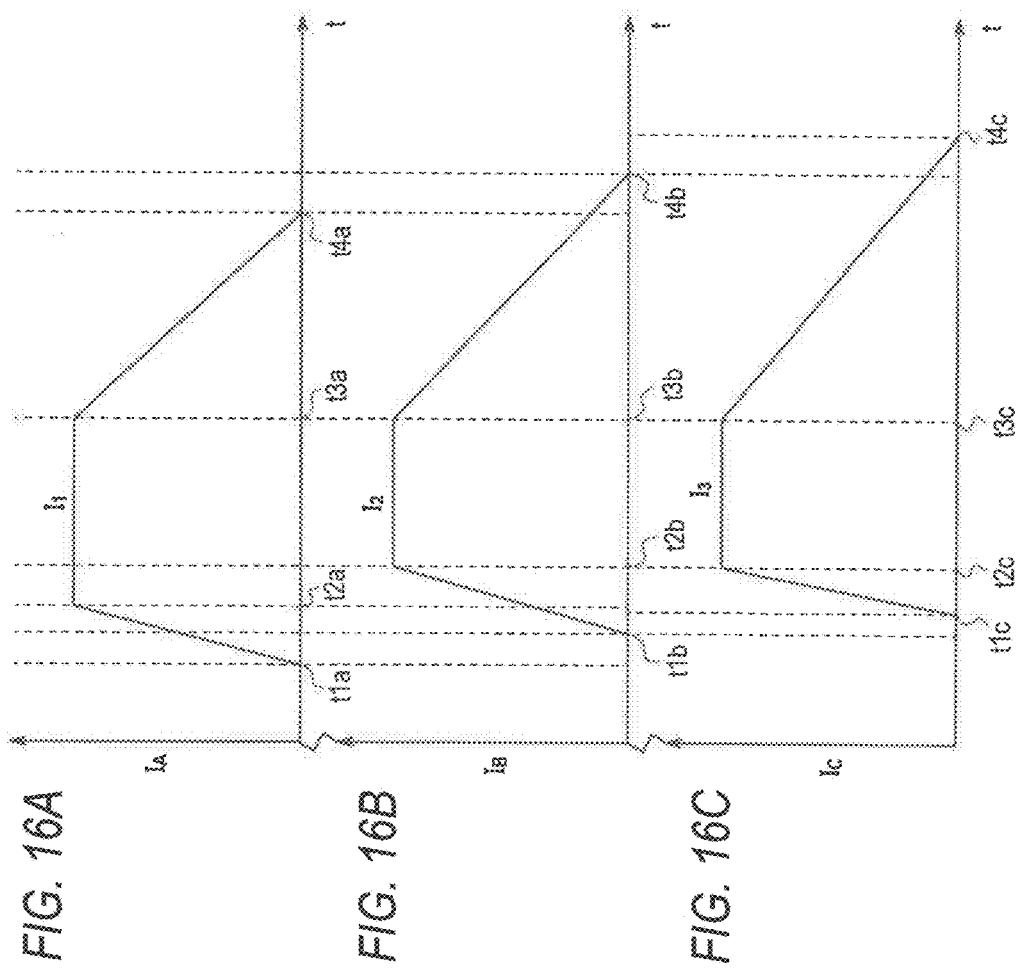
FIGS. 16A to 16C are views for explaining the lighting control by the fifth embodiment.

FIG. 15 is a schematic block diagram of the electric circuit configuration of the illumination device 2001' of FIG. 14. As shown in FIG. 15, the third light source 2020C is electrically connected to the control portion 2030 provided with a control circuit like the first and second light sources 2020A and 2020B. The control portion 2030 performs the lighting control of the third light source 2020C as well as the lighting control of the first and second light sources 2020A and 2020B.

The third light source 2020C has an LED 2021C. Instead of the LED 2021C, a known light source such as an EL (electro luminescence) element, an incandescent light bulb, a halogen lamp or a cold-cathode tube may be adopted. The light emitted from the third light source 2020C may be of any color.

(Lighting Control)

FIGS. 16A to 16C are views for explaining an example of the lighting control performed by the control portion 2030 according to the present embodiment. FIG. 16A is an explanatory view showing the mode of control of the brightness $I_A$ of the first light source 2020A of the illumination device 2001' with the horizontal axis representing the time t. FIG. 16B is an explanatory view showing the mode of control of the brightness $I_B$ of the second light source 2020B of illumination device 2001' with the horizontal axis representing the time t. FIG. 16C is an explanatory view showing the mode of control of the brightness $I_C$ of the third light source 2020C of the illumination device 2001' with the horizontal axis representing the time t.

As in the third embodiment, the lighting control performed by the control portion 2030 for the first light source 2020A includes, as shown in FIG. 16A, a first increase control to gradually increase the brightness $I_A$ of the first light source 2020A from zero to a first set brightness $I_1$, a first maintenance control to maintain the brightness $I_A$ of the first light source 2020A at the first set brightness $I_1$ subsequently to the first increase control, and a first decrease control to gradually decrease the brightness of the first light source 2020A from the first set brightness $I_1$ to zero subsequently to the first maintenance control. Moreover, as in the third embodiment, the lighting control performed by the control portion 2030 for the second light source 2020B includes, as shown in FIG. 16B, a second increase control to gradually increase the brightness $I_B$ of the second light source 2020B from zero to a second set brightness $I_2$, a second maintenance control to maintain the brightness $I_B$ of the second light source 2020B at the second set brightness $I_2$ subsequently to the second increase control, and a second decrease control to gradually decrease the brightness $I_B$ of the second light source 2020B from the second set brightness $I_2$ to zero subsequently to the second maintenance control. The order of the time points t1a to t4a of the controls shown in FIGS. 16A and 16B is the same as that described with respect to the third embodiment, and description thereof is omitted here.

The lighting control performed by the control portion 2030 of the fifth embodiment for the third light source 2020C includes, as shown in FIG. 16C, a third increase control to gradually increase the brightness $I_C$ of the third light source 2020C from zero to a third set brightness $I_3$, a third maintenance control to maintain the brightness $I_C$ of the third light source 2020C at the third set brightness $I_3$ subsequently to the third increase control, and a third decrease control to gradually decrease the brightness of the third light source 2020C from the third set brightness $I_3$ to zero subsequently to the third maintenance control.

When the time point at which the control portion 2030 begins to increase the brightness $I_C$ of the third light source 2020C from zero by the third increase control is a third increase beginning time point t1c, the second increase beginning time point t1b is prior to the third increase beginning time point t1c.

Moreover, when the time point at which the control portion 2030 finishes increasing the brightness $I_C$ of the third light source 2020C to the third set brightness $I_3$ by the third increase control is a third increase finish time point t2c, the second increase finish time point t2b is simultaneous with the third increase finish time point t2c or prior to the third increase finish time point t2c.

Moreover, when the time point at which the control portion 2030 begins to decrease the brightness $I_C$ of the third light source 2020C from the third set brightness $I_3$ by the third decrease control is a third decrease beginning time point t3c, the second decrease beginning time point t3b is simultaneous with the third decrease beginning time point t3c.

Further, the time from the first increase beginning time point t1a to the third increase finish time point t2c is not more than 0.2 seconds.

According to this lighting control, a presentation can be provided such that light appears as if flowing more smoothly from one end side of the first light guide 2010A toward the other end side of the second light guide 2010B of the illumination device 2001'. In particular, the visibility of the light that appears as if flowing from one end side toward the other end side of the second light guide 2010B is improved. In the comparison with the illumination device 2001 of the third embodiment, since the third light source 2020C is added, the brightness of the second light guide 2010B can be improved.

Moreover, in the lighting control of the illumination device 2001' shown in FIGS. 16A to 16C, the increase speed of the brightness $I_B$ of the second light source 2020B in the second increase control and the increase speed of the brightness $I_C$ of the third light source 2020C in the third increase control may be set so that one end side of the second light guide 2010B is always visually recognized as being brighter than the other end side thereof until immediately before the third increase finish time point t2c. The second increase finish time point t2b may be prior to the third increase finish time point t2c.

While the second and third set brightnesses $I_2$ and $I_3$ may be set so that one end and the other end of the second light guide 2010B appear as bright as each other, the present invention is not limited thereto.

The decrease speed of the brightness $I_B$ of the second light source 2020B and the decrease speed of the brightness $I_C$ of the third light source 2020C in the second decrease control and the third decrease control may be set so that one end side of the second light guide 2010B is always visually recognized as being darker than the other end side up to a third decrease finish time point t4c. Alternatively, they may be set so that one end side and the other end side of the second light guide 2010B always appear substantially as bright as each other. While the second decrease finish time point t4b is prior to the third decrease finish time point t4c in the present embodiment, they may be simultaneous with each other. The second decrease control and the third decrease control may be ones that simultaneously and instantaneously make the brightnesses $I_B$ and $I_C$ of the second and third light sources 2020B and 2020C zero.

The above-described lighting control of the first to third light sources 2020A, 2020B and 2020C may be repetitively performed, and in that case, the lighting control may be successively and continuously performed by starting the first increase control of the next lighting control at the third decrease finish time point t4c which is the finish time point of the third decrease control. Moreover, an unlit time may be inserted between the third decrease finish time point t4c and the start of the first increase control of the next lighting control.

The brightness $I_C$ of the third light source 2020C may be increased exponentially with respect to the time t also in the third increase control.

Sixth Embodiment

Figure 17:
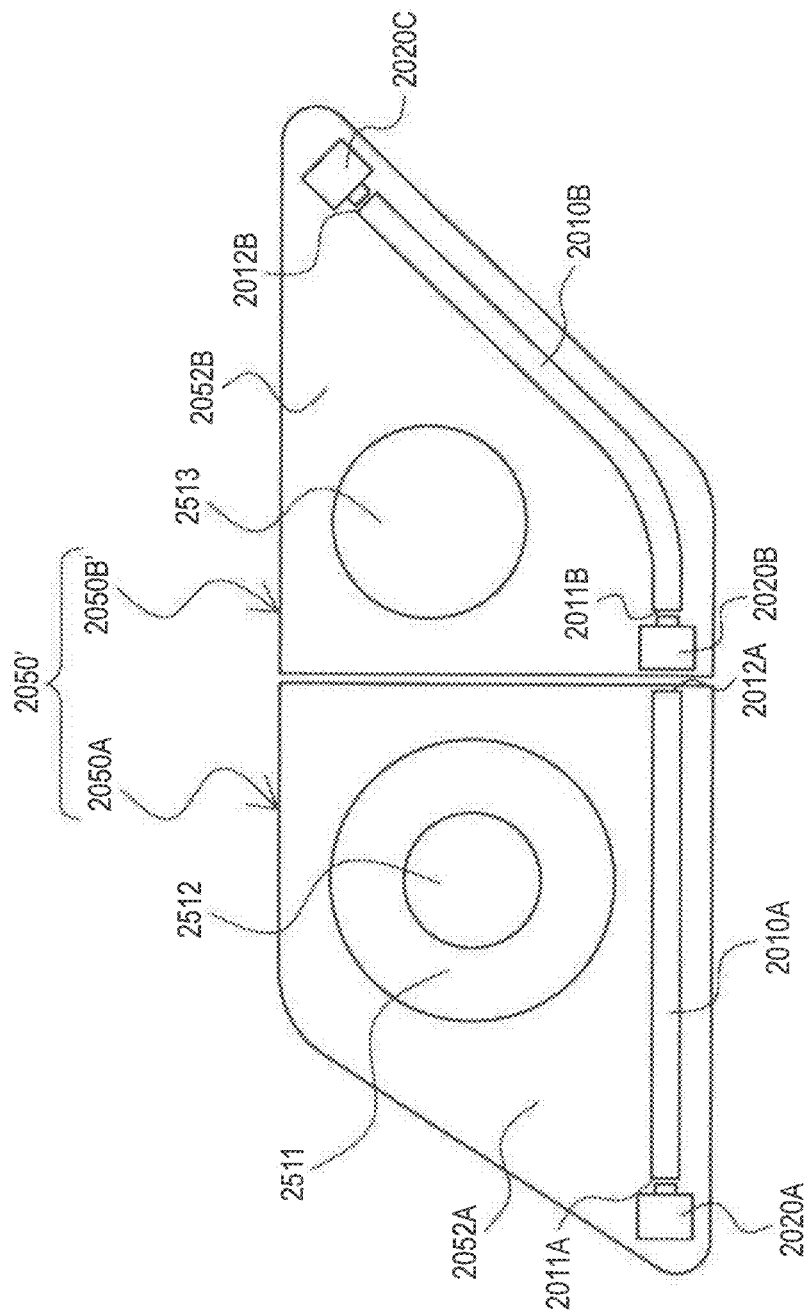
FIG. 17 is a schematic view for explaining the structure of a turn lamp according to a sixth embodiment of the present invention.

An example in which the illumination device 2001' of the fifth embodiment is applied to a turn lamp of a vehicle such as a car will be described based on FIG. 17. FIG. 17 is a schematic view showing a rear combination lamp 2050' attached to the rear right side of the body of a car as an example of an automotive lamp body unit including the illumination device 2001' as a turn lamp of the present embodiment, and is a schematic view of the rear combination lamp 2050' viewed from behind the car. Comparing with the structure of FIG. 13, this embodiment is different in that the third light source 2020C is added. Description of characteristics similar to those of the structure of FIG. 13 is partly omitted.

The rear combination lamp 2050' is formed of two portions of the first portion 2050A disposed on the rear surface of the trunk room lid 2101 of the car 2100 (see FIGS. 12A and 12B) and a second portion 2050B' disposed on the rear surface of the body 2102 of the car 2100. The first portion 2050A has the same structure as the first portion 2050A of the rear combination lamp 2050 of the fourth embodiment. The second portion 2050B' is provided with the second light guide 2010B, the second light source 2020B, the third light source 2020C, the lamp body 2513 (for example, any of a brake lamp, a back lamp and a position lamp), the second casing 2052B facing inside the vehicle body, and a resin cover (not shown) fitted on the outer periphery of the second casing 2052B to serve as the obverse side of the second portion 2050B. The first and second light guides 2010A and 2010B and the first to third light sources 2020A, 2020B and 2020C of FIG. 17, and the control portion 2030 shown in FIG. 15 constitute the illumination device 2001'.

In the rear combination lamp 2050' of the present embodiment, the lighting control of the illumination device 2001' described based on FIG. 16A to 16C or lighting control as a modification thereof is performed, light appears as if flowing from the left side end portion of the first light guide 2010A toward the right side end portion of the second light guide 2010B when viewed from behind the vehicle body. By this illumination mode, when the right side turn lamp (the illumination device 2001') is lit, a presentation can be provided such that light flows in the direction of the length of the first and second light guides 2010A and 2010B toward the right side which is the travel direction change direction of the car, so that an external observer can be more clearly notified of the travel direction change direction of the car.

When the illumination device 2001' of the present invention is used as a turn lamp of a car as in the present embodiment, it can be shown as an example that the length from one end of the first light guide 2010A to the other end of the second light guide 2010B is within a range of approximately 200 mm to 500 mm. Moreover, it can be shown as an example that the emission color of the first to third light sources 2020A, 2020B and 2020C and the first and second light guides 2010A and 2010B is amber.

Moreover, in the lighting control of FIG. 16A to 16C or lighting control of a modification thereof, it is preferable that the time from the first increase beginning time point t1a to the third decrease finish time point t4c be within a range of 0.25 seconds to one second. Moreover, it is preferable that the time from the third decrease beginning time point t3c to the third decrease finish time point t4c be not more than 0.5 seconds. This is because an illumination effect such that light appears as if flowing smoothly from one end side of the first light guide 2010A toward the other end side of the second light guide 2010B can be produced more suitably.

Moreover, it is preferable that the time from the third increase finish time point t2c to the third decrease beginning time point t3c be not less than 0.05 seconds. This is in order to sufficiently secure the time to maintain the first to third light sources 2020A, 2020B and 2020C at the first, second and third set brightnesses $I_1$, $I_2$ and $I_3$, respectively.

A rear combination lamp for the left side symmetrical to the rear combination lamp 2050' of FIG. 17 may be disposed on the rear left side of the vehicle body as shown in FIGS. 12A and 12B, and when the lighting control of the illumination device 2001' described based on FIGS. 16A to 16C or lighting control of a modification thereof is performed for the rear combination lamp for the left side, an illumination effect such that light appears as if flowing from the right side end portion of the first light guide 2010A toward the left side end portion of the second light guide 2010B is obtained when viewed from behind the vehicle body. Similar lighting control may be performed while the illumination device 2001' according to the present invention is used as the turn lamps on both front right and left sides of the vehicle body.

When the illumination device 2001' as a turn lamp is lit as a hazard lamp, the lighting control shown in FIGS. 16A to 16C or lighting control of a modification thereof may be performed.

The lighting control shown in FIGS. 16A to 16C or lighting control of a modification thereof may be performed irrespective of whether the trunk room lid 2101 is opened or closed.

(Modification)

The second light source 2020B of the illumination device 2001 according to the third embodiment and the fourth embodiment may be disposed not on one end side of the second light guide 2010B but on the other end side thereof to perform the lighting control shown in FIGS. 9A and 9B, 10A to 10G or 11A and 11B by applying light from the second light source 2020B to the other end surface 2012B of the second light guide 2010B.

The second light source 2020B of the illumination devices 2001 and 2001' of the present invention may be disposed on the reverse side of the other end of the first light guide 2010A so that the second light source 2020B is not seen from the front of the illumination devices 2001 and 2001'.

In addition to the usage as a turn lamp, the illumination devices 2001 and 2001' of the present invention may be used as lamps provided in the cabin such as a room lamp provided on the roof trim of the vehicle to illuminate the entire area inside the cabin, a scuff lamp provided at the foot side of the door opening portion and emitting light upward when the door is opened and closed, a foot lamp provided in a lower part of the instrument panel to illuminate the feet of a passenger on a front seat, and a door pocket lamp provided inside the door pocket of the door trim and emitting light upward from inside the door pocket. Further, not only for usages on vehicles but the present invention may be used for various usages as required such as a traffic signal, an advertisement display lamp, a warning indicator lamp, illumination for a building or a garden and an advertising balloon lamp.

According to a first aspect of the invention, there is provided an illumination device comprising: an elongated light guide; a first light source that applies light to a first end surface of the light guide; a second light source that applies light to a second end surface of the light guide; and a controller that performs lighting control of the first light source and the second light source, wherein the lighting control includes: a first increase control to increase a brightness of the first light source from zero to a first set brightness; a first maintenance control to maintain the brightness of the first light source at the first set brightness subsequently to the first increase control; and a first decrease control to decrease the brightness of the first light source from the first set brightness to zero subsequently to the first maintenance control, the lighting control includes: a second increase control to increase a brightness of the second light source from zero to a second set brightness; a second maintenance control to maintain the brightness of the second light source at the second set brightness subsequently to the second increase control; and a second decrease control to decrease the brightness of the second light source from the second set brightness to zero subsequently to the second maintenance control, when a time point at which the controller begins to increase the brightness of the first light source from zero by the first increase control is a first increase beginning time point and a time point at which the controller begins to increase the brightness of the second light source from zero by the second increase control is a second increase beginning time point, the first increase beginning time point is prior to the second increase beginning time point, when a time point at which the controller finishes increasing the brightness of the first light source to the first set brightness by the first increase control is a first increase finish time point and a time point at which the controller finishes increasing the brightness of the second light source to the second set brightness by the second increase control is a second increase finish time point, the first increase finish time point is simultaneous with the second increase finish time point or prior to the second increase finish time point, when a time point at which the controller begins to decrease the brightness of the first light source from the first set brightness by the first decrease control is a first decrease beginning time point and a time point at which the controller begins to decrease the brightness of the second light source from the second set brightness by the second decrease control is a second decrease beginning time point, the first decrease beginning time point is simultaneous with the second decrease beginning time point, and a time from the first increase beginning time point to the second increase finish time point is not more than 0.2 seconds.

According to the first aspect of the present invention, an illumination effect such that light appears as if flowing smoothly from the first end surface side toward the second end surface side of the light guide can be produced suitably. In particular, by setting the time from the first increase beginning time point to the second increase finish time point to not more than 0.2 seconds, the startup of the brightness of the light guide can be performed within a suitable time range, so that the above-mentioned illumination effect such that light appears as if flowing smoothly can be produced suitably.

Moreover, according to the second aspect of the present invention, in the above-described illumination device, when the time point at which the controller finishes decreasing the brightness of the first light source to zero by the first decrease control is the first decrease finish time point and the time point at which the controller finishes decreasing the brightness of the second light source to zero by the second decrease control is the second decrease finish time point, the first decrease finish time point is simultaneous with the second decrease finish time point or prior to the second decrease finish time point.

According to this structure, an illumination effect such that light appears as if flowing smoothly from the first end surface side toward the second end surface side of the light guide can be produced more suitably.

Moreover, according to the third aspect of the present invention, in the above-described illumination device, the time from the first increase beginning time point to the second decrease finish time point is within a range of 0.25 seconds to one second.

Moreover, according to the fourth aspect of the present invention, in the above-described illumination device, the time from the second decrease beginning time point to the second decrease finish time point is not more than 0.5 seconds.

According to these structures, an illumination effect such that light appears as if flowing smoothly from the first end surface side toward the second end surface side of the light guide can be produced more suitably.

Moreover, according to the fifth aspect of the present invention, in the above-described illumination device, the time from the second increase finish time point to the second decrease beginning time point is not less than 0.05 seconds.

According to this structure, a predetermined time or more can be secured as the time to maintain the first light source at the first set brightness and maintain the second light source at the second set brightness.

Moreover, according to the sixth aspect of the present invention, in the above-described illumination device, the controller increases the brightness of the first light source exponentially with respect to time by the first increase control.

Moreover, according to the seventh aspect of the present invention, in the above-described illumination device, the controller increases the brightness of the second light source exponentially with respect to time by the second increase control.

According to these structures, an illumination effect can be produced such that light appears as if flowing linearly (that is, flowing at a substantially constant speed) with the lapse of time from the first end surface side toward the second end surface side of the light guide.

Moreover, the lighting control method of an illumination device according to an eighth embodiment of the present invention is a lighting control method of the illumination device provided with: the elongated light guide; the first light source that applies light to the first end surface of the light guide; and the second light source that applies light to the second end surface of the light guide. The lighting control method includes: the first increase step of increasing the brightness of the first light source from zero to the first set brightness; the first maintenance step of maintaining the brightness of the first light source at the first set brightness subsequently to the first increase step; the first decrease step of decreasing the brightness of the first light source from the first set brightness to zero subsequently to the first maintenance step; the second increase step of increasing the brightness of the second light source from zero to the second set brightness; the second maintenance step of maintaining the brightness of the second light source at the second set brightness subsequently to the second increase step; and the second decrease step of decreasing the brightness of the second light source from the second set brightness to zero subsequently to the second maintenance step. When the time point at which the first increase step begins to increase the brightness of the first light source from zero is the first increase beginning time point and the time point at which the second increase step begins to increase the brightness of the second light source from zero is the second increase beginning time point, the first increase beginning time point is prior to the second increase beginning time point. When the time point at which the first increase step finishes increasing the brightness of the first light source to the first set brightness is the first increase finish time point and the time point at which the second increase step finishes increasing the brightness of the second light source to the second set brightness is the second increase finish time point, the first increase finish time point is simultaneous with the second increase finish time point or prior to the second increase finish time point. When the time point at which the first decrease step begins to decrease the brightness of the first light source from the first set brightness is the first decrease beginning time point and the time point at which the second decrease step begins to decrease the brightness of the second light source from the second set brightness is the second decrease beginning time point, the first decrease beginning time point is simultaneous with the second decrease beginning time point, and the time from the first increase beginning time point to the second increase finish time point is not more than 0.2 seconds.

According to this method, a similar effect to that of the first aspect of the present invention can be obtained.

According to a ninth aspect of the invention, there is provided an illumination device comprising: a first light guide and a second light guide that are elongated, the first light guide and the second light guide disposed in series with each other in a direction of a length thereof; a first light source that applies light to a first end surface of the first light guide on a side farther from the second light guide; a second light source that applies light to a first end surface of the second light guide on a side closer to the first light guide; and a controller that performs lighting control including control of lighting of the first light source and the second light source, wherein the lighting control includes: a first increase control to increase a brightness of the first light source from zero to a first set brightness; a first maintenance control to maintain the brightness of the first light source at the first set brightness subsequently to the first increase control; and a first decrease control to decrease the brightness of the first light source from the first set brightness to zero subsequently to the first maintenance control, the lighting control includes: a second increase control to increase a brightness of the second light source from zero to a second set brightness; a second maintenance control to maintain the brightness of the second light source at the second set brightness subsequently to the second increase control; and a second decrease control to decrease the brightness of the second light source from the second set brightness to zero subsequently to the second maintenance control, when a time point at which the controller begins to increase the brightness of the first light source from zero by the first increase control is a first increase beginning time point and a time point at which the controller begins to increase the brightness of the second light source from zero by the second increase control is a second increase beginning time point, the first increase beginning time point is prior to the second increase beginning time point, when a time point at which the controller finishes increasing the brightness of the first light source to the first set brightness by the first increase control is a first increase finish time point and a time point at which the controller finishes increasing the brightness of the second light source to the second set brightness by the second increase control is a second increase finish time point, the first increase finish time point is prior to the second increase finish time point, when a time point at which the controller begins to decrease the brightness of the first light source from the first set brightness by the first decrease control is a first decrease beginning time point and a time point at which the controller begins to decrease the brightness of the second light source from the second set brightness by the second decrease control is a second decrease beginning time point, the first decrease beginning time point is simultaneous with the second decrease beginning time point, and a time from the first increase beginning time point to the second increase finish time point is not more than 0.2 seconds.

According to the ninth aspect of the present invention, an illumination effect such that light appears as if flowing smoothly from the first end surface side of the first light guide toward the second end surface side opposite to the first end surface of the second light guide can be produced suitably. In particular, by setting the time from the first increase beginning time point to the second increase finish time point to not more than 0.2 seconds, the startup of the brightness of the light guide can be performed within a suitable time range, so that the above-mentioned illumination effect such that light appears as if flowing smoothly can be produced suitably.

Moreover, the illumination device of the above-described aspect uses a combination of the first light source and the first light guide and a combination of the second light source and the second light guide and adopts an arrangement where the second light source applies light to the first end surface of the second light guide on the side closer to the first light guide. For this reason, a problem can be avoided in that brightness is insufficient in the neighborhood of the central part of the light guide which problem can arise in the structure where a light source is disposed at each end of an elongated light guide. Moreover, by placing the combination of the first light source and the first light guide on one member of two separable members and placing the combination of the second light source and the second light guide on the other member, a presentation such that light appears as if flowing from the first light guide over to the second light guide can be provided with a small number of light sources.

Moreover, according to the tenth aspect of the present invention, in the above-described illumination device, the second increase beginning time point is simultaneous with the first increase finish time point or prior to the first increase finish time point.

Moreover, according to the eleventh aspect of the present invention, in the above-described illumination device, when the time point at which the controller finishes decreasing the brightness of the first light source to zero by the first decrease control is the first decrease finish time point and the time point at which the controller finishes decreasing the brightness of the second light source to zero by the second decrease control is the second decrease finish time point, the first decrease finish time point is simultaneous with the second decrease finish time point or prior to the second decrease finish time point.

According to this structure, an illumination effect such that light appears as if flowing smoothly from the first end surface side of the first light guide toward the second end surface side of the second light guide can be produced more suitably.

Moreover, according to the twelfth aspect of the present invention, in the above-described illumination device, the time from the first increase beginning time point to the second decrease finish time point is within a range of 0.25 seconds to one second.

Moreover, according to the thirteenth aspect of the present invention, in the above-described illumination device, the time from the second decrease beginning time point to the second decrease finish time point is not more than 0.5 seconds.

According to these structures, an illumination effect such that light appears as if flowing smoothly from the first end surface side of the first light guide toward the second end surface side of the second light guide can be produced more suitably.

Moreover, according to the fourteenth aspect of the present invention, in the above-described illumination device, the time from the second increase finish time point to the second decrease beginning time point is not less than 0.05 seconds.

According to this structure, a predetermined time or more can be secured as the time to maintain the first light source at the first set brightness and maintain the second light source at the second set brightness.

Moreover, according to the fifteenth aspect of the present invention, in the above-described illumination device, the controller increases the brightness of the first light source exponentially with respect to time by the first increase control.

Moreover, according to the sixteenth aspect of the present invention, in the above-described illumination device, the controller increases the brightness of the second light source exponentially with respect to time by the second increase control.

According to these structures, an illumination effect can be produced such that light appears as if flowing linearly (that is, flowing at a substantially constant speed) with the lapse of time from the first end surface side of the first light guide toward the second end surface side of the second light guide.

Moreover, according to the seventeenth aspect of the present invention, in the above-described illumination device, the third light source that applies light to the second end surface of the second light guide which is the side farther from the first light guide is further provided. The lighting control further includes control of lighting of the third light source. The lighting control includes: the third increase control to increase the brightness of the third light source from zero to the third set brightness; the third maintenance control to maintain the brightness of the third light source at the third set brightness subsequently to the third increase control; and the third decrease control to decrease the brightness of the third light source from the third set brightness to zero subsequently to the third maintenance control. When the time point at which the controller begins to increase the brightness of the third light source from zero by the third increase control is the third increase beginning time point, the second increase beginning time point is prior to the third increase beginning time point. When the time point at which the controller finishes increasing the brightness of the third light source to the third set brightness by the third increase control is the third increase finish time point, the second increase finish time point is simultaneous with the third increase finish time point or prior to the third increase finish time point. When the time point at which the controller begins to decrease the brightness of the third light source from the third set brightness by the third decrease control is the third decrease beginning time point, the second decrease beginning time point is simultaneous with the third decrease beginning time point, and the time from the first increase beginning time point to the third increase finish time point is not more than 0.2 seconds.

According to this structure, an illumination effect such that light appears as if flowing smoothly from the first end surface side of the first light guide toward the second end surface side of the second light guide can be produced more suitably.

Moreover, the lighting control method of the illumination device according to an eighteenth aspect of the present invention is a lighting control method of the illumination device provided with: the first light guide and the second light guide that are elongated, the first light guide and the second light guide being disposed in series with each other in the direction of the length thereof; the first light source that applies light to the first end surface of the first light guide on the side farther from the second light guide; and the second light source that applies light to the first end surface of the second light guide on the side closer to the first light guide. The lighting control method includes: the first increase step of increasing the brightness of the first light source from zero to the first set brightness; the first maintenance step of maintaining the brightness of the first light source at the first set brightness subsequently to the first increase step; the first decrease step of decreasing the brightness of the first light source from the first set brightness to zero subsequently to the first maintenance step; the second increase step of increasing the brightness of the second light source from zero to the second set brightness; the second maintenance step of maintaining the brightness of the second light source at the second set brightness subsequently to the second increase step; and the second decrease step of decreasing the brightness of the second light source from the second set brightness to zero subsequently to the second maintenance step. When the time point at which the first increase step begins to increase the brightness of the first light source from zero is the first increase beginning time point and the time point at which the second increase step begins to increase the brightness of the second light source from zero is the second increase beginning time point, the first increase beginning time point is prior to the second increase beginning time point. When the time point at which the first increase step finishes increasing the brightness of the first light source to the first set brightness is the first increase finish time point and the time point at which the second increase step finishes increasing the brightness of the second light source to the second set brightness is the second increase finish time point, the first increase finish time point is prior to the second increase finish time point. When the time point at which the first decrease step begins to decrease the brightness of the first light source from the first set brightness is the first decrease beginning time point and the time point at which the second decrease step begins to decrease the brightness of the second light source from the second set brightness is the second decrease beginning time point, the first decrease beginning time point is simultaneous with the second decrease beginning time point, and the time from the first increase beginning time point to the second increase finish time point is not more than 0.2 seconds.

According to this method, a similar effect to that of the first aspect of the present invention can be obtained.

The above-described plurality of embodiments of the present invention and modifications thereof merely show representative modes of the present invention, and the present invention is not limited thereto. Therefore, the present invention may be carried out in various modifications within a scope not departing from the gist of the present invention, that is, one that a person having ordinary skill in the art can easily arrive at from the matters described in the present specification and one that is substantially the same as the invention described in the present specification, a so-called equivalent scope, and those are also embraced in the present invention.

What is claimed is:

1. An illumination device comprising:
an elongated light guide;
a first light source that applies light to a first end surface of the light guide;
a second light source that applies light to a second end surface of the light guide; and
a controller that performs lighting control of the first light source and the second light source, wherein
the lighting control includes: a first increase control to increase a brightness of the first light source from zero to a first set brightness; a first maintenance control to maintain the brightness of the first light source at the first set brightness subsequently to the first increase control; and a first decrease control to decrease the brightness of the first light source from the first set brightness to zero subsequently to the first maintenance control,
the lighting control includes: a second increase control to increase a brightness of the second light source from zero to a second set brightness; a second maintenance control to maintain the brightness of the second light source at the second set brightness subsequently to the second increase control; and a second decrease control to decrease the brightness of the second light source from the second set brightness to zero subsequently to the second maintenance control,
when a time point at which the controller begins to increase the brightness of the first light source from zero by the first increase control is a first increase beginning time point and a time point at which the controller begins to increase the brightness of the second light source from zero by the second increase control is a second increase beginning time point, the first increase beginning time point is prior to the second increase beginning time point,
when a time point at which the controller finishes increasing the brightness of the first light source to the first set brightness by the first increase control is a first increase finish time point and a time point at which the controller finishes increasing the brightness of the second light source to the second set brightness by the second increase control is a second increase finish time point, the first increase finish time point is simultaneous with the second increase finish time point or prior to the second increase finish time point,
when a time point at which the controller begins to decrease the brightness of the first light source from the first set brightness by the first decrease control is a first decrease beginning time point and a time point at which the controller begins to decrease the brightness of the second light source from the second set brightness by the second decrease control is a second decrease beginning time point, the first decrease beginning time point is simultaneous with the second decrease beginning time point, and
a time from the first increase beginning time point to the second increase finish time point is not more than 0.2 seconds.

2. The illumination device according to claim 1, wherein when a time point at which the controller finishes decreasing the brightness of the first light source to zero by the first decrease control is a first decrease finish time point and a time point at which the controller finishes decreasing the brightness of the second light source to zero by the second decrease control is a second decrease finish time point, the first decrease finish time point is simultaneous with the second decrease finish time point or prior to the second decrease finish time point.

3. The illumination device according to claim 2, wherein a time from the first increase beginning time point to the second decrease finish time point is within a range of 0.25 seconds to one second.

4. The illumination device according to claim 2, wherein a time from the second decrease beginning time point to the second decrease finish time point is not more than 0.5 seconds.

5. The illumination device according to claim 1, wherein a time from the second increase finish time point to the second decrease beginning time point is not less than 0.05 seconds.

6. The illumination device according to claim 1, wherein the controller increases the brightness of the first light source exponentially with respect to time by the first increase control.

7. The illumination device according to claim 1, wherein the controller increases the brightness of the second light source exponentially with respect to time by the second increase control.

8. A lighting control method of an illumination device comprising: an elongated light guide; a first light source that applies light to a first end surface of the light guide; and a second light source that applies light to a second end surface of the light guide, the lighting control method comprising:
a first increase process of increasing a brightness of the first light source from zero to a first set brightness;
a first maintenance process of maintaining the brightness of the first light source at the first set brightness subsequently to the first increase process,
a first decrease process of decreasing the brightness of the first light source from the first set brightness to zero subsequently to the first maintenance process;
a second increase process of increasing a brightness of the second light source from zero to a second set brightness;
a second maintenance process of maintaining the brightness of the second light source at the second set brightness subsequently to the second increase process; and
a second decrease process of decreasing the brightness of the second light source from the second set brightness to zero subsequently to the second maintenance process, wherein
when a time point at which the first increase process begins to increase the brightness of the first light source from zero is a first increase beginning time point and a time point at which the second increase process begins to increase the brightness of the second light source from zero is a second increase beginning time point, the first increase beginning time point is prior to the second increase beginning time point,
when a time point at which the first increase process finishes increasing the brightness of the first light source to the first set brightness is a first increase finish time point and a time point at which the second increase process finishes increasing the brightness of the second light source to the second set brightness is a second increase finish time point, the first increase finish time point is simultaneous with the second increase finish time point or prior to the second increase finish time point,
when a time point at which the first decrease process begins to decrease the brightness of the first light source from the first set brightness is a first decrease beginning time point and a time point at which the second decrease process begins to decrease the brightness of the second light source from the second set brightness is a second decrease beginning time point, the first decrease beginning time point is simultaneous with the second decrease beginning time point, and
a time from the first increase beginning time point to the second increase finish time point is not more than 0.2 seconds.

9. An illumination device comprising:
a first light guide and a second light guide that are elongated, the first light guide and the second light guide disposed in series with each other in a direction of a length thereof;
a first light source that applies light to a first end surface of the first light guide on a side farther from the second light guide;
a second light source that applies light to a first end surface of the second light guide on a side closer to the first light guide; and
a controller that performs lighting control including control of lighting of the first light source and the second light source, wherein
the lighting control includes: a first increase control to increase a brightness of the first light source from zero to a first set brightness; a first maintenance control to maintain the brightness of the first light source at the first set brightness subsequently to the first increase control; and a first decrease control to decrease the brightness of the first light source from the first set brightness to zero subsequently to the first maintenance control,
the lighting control includes: a second increase control to increase a brightness of the second light source from zero to a second set brightness; a second maintenance control to maintain the brightness of the second light source at the second set brightness subsequently to the second increase control; and a second decrease control to decrease the brightness of the second light source from the second set brightness to zero subsequently to the second maintenance control,
when a time point at which the controller begins to increase the brightness of the first light source from zero by the first increase control is a first increase beginning time point and a time point at which the controller begins to increase the brightness of the second light source from zero by the second increase control is a second increase beginning time point, the first increase beginning time point is prior to the second increase beginning time point,
when a time point at which the controller finishes increasing the brightness of the first light source to the first set brightness by the first increase control is a first increase finish time point and a time point at which the controller finishes increasing the brightness of the second light source to the second set brightness by the second increase control is a second increase finish time point, the first increase finish time point is prior to the second increase finish time point,
when a time point at which the controller begins to decrease the brightness of the first light source from the first set brightness by the first decrease control is a first decrease beginning time point and a time point at which the controller begins to decrease the brightness of the second light source from the second set brightness by the second decrease control is a second decrease beginning time point, the first decrease beginning time point is simultaneous with the second decrease beginning time point, and
a time from the first increase beginning time point to the second increase finish time point is not more than 0.2 seconds.

10. The illumination device according to claim 9, wherein the second increase beginning time point is simultaneous with the first increase finish time point or prior to the first increase finish time point.

11. The illumination device according to claim 9, wherein when a time point at which the controller finishes decreasing the brightness of the first light source to zero by the first decrease control is a first decrease finish time point and a time point at which the controller finishes decreasing the brightness of the second light source to zero by the second decrease control is a second decrease finish time point, the first decrease finish time point is simultaneous with the second decrease finish time point or prior to the second decrease finish time point.

12. The illumination device according to claim 11, wherein a time from the first increase beginning time point to the second decrease finish time point is within a range of 0.25 seconds to one second.

13. The illumination device according to claim 11, wherein a time from the second decrease beginning time point to the second decrease finish time point is not more than 0.5 seconds.

14. The illumination device according to claim 9, wherein a time from the second increase finish time point to the second decrease beginning time point is not less than 0.05 seconds.

15. The illumination device according to claim 9, wherein the controller increases the brightness of the first light source exponentially with respect to time by the first increase control.

16. The illumination device according to claim 9, wherein the controller increases the brightness of the second light source exponentially with respect to time by the second increase control.

17. The illumination device according to claim 9, further comprising: a third light source that applies light to a second end surface of the second light guide which is a side farther from the first light guide, wherein
the lighting control further includes control of lighting of the third light source,
the lighting control includes: a third increase control to increase a brightness of the third light source from zero to a third set brightness; a third maintenance control to maintain the brightness of the third light source at the third set brightness subsequently to the third increase control; and a third decrease control to decrease the brightness of the third light source from the third set brightness to zero subsequently to the third maintenance control,
when a time point at which the controller begins to increase the brightness of the third light source from zero by the third increase control is a third increase beginning time point, the second increase beginning time point is prior to the third increase beginning time point,
when a time point at which the controller finishes increasing the brightness of the third light source to the third set brightness by the third increase control is a third increase finish time point, the second increase finish time point is simultaneous with the third increase finish time point or prior to the third increase finish time point,
when a time point at which the controller begins to decrease the brightness of the third light source from the third set brightness by the third decrease control is a third decrease beginning time point, the second decrease beginning time point is simultaneous with the third decrease beginning time point, and
a time from the first increase beginning time point to the third increase finish time point is not more than 0.2 seconds.

18. A lighting control method of an illumination device comprising: a first light guide and a second light guide that are elongated, the first light guide and the second light guide disposed in series with each other in a direction of a length thereof; a first light source that applies light to a first end surface of the first light guide on a side farther from the second light guide; and a second light source that applies light to a first end surface of the second light guide on a side closer to the first light guide, the lighting control method comprising:
a first increase process of increasing a brightness of the first light source from zero to a first set brightness;
a first maintenance process of maintaining the brightness of the first light source at the first set brightness subsequently to the first increase process;
a first decrease process of decreasing the brightness of the first light source from the first set brightness to zero subsequently to the first maintenance process;
a second increase process of increasing a brightness of the second light source from zero to a second set brightness;
a second maintenance process of maintaining the brightness of the second light source at the second set brightness subsequently to the second increase process; and
a second decrease process of decreasing the brightness of the second light source from the second set brightness to zero subsequently to the second maintenance process,
wherein when a time point at which the first increase process begins to increase the brightness of the first light source from zero is a first increase beginning time point and a time point at which the second increase process begins to increase the brightness of the second light source from zero is a second increase beginning time point, the first increase beginning time point is prior to the second increase beginning time point,
when a time point at which the first increase process finishes increasing the brightness of the first light source to the first set brightness is a first increase finish time point and a time point at which the second increase process finishes increasing the brightness of the second light source to the second set brightness is a second increase finish time point, the first increase finish time point is prior to the second increase finish time point,
when a time point at which the first decrease process begins to decrease the brightness of the first light source from the first set brightness is a first decrease beginning time point and a time point at which the second decrease process begins to decrease the brightness of the second light source from the second set brightness is a second decrease beginning time point, the first decrease beginning time point is simultaneous with the second decrease beginning time point, and
a time from the first increase beginning time point to the second increase finish time point is not more than 0.2 seconds.

* * * * *